United States Patent
Tsukuda et al.

(10) Patent No.: US 8,470,427 B2
(45) Date of Patent: Jun. 25, 2013

(54) MANUFACTURING METHOD OF INFORMATION RECORDING MEDIUM AND INFORMATION RECORDING MEDIUM

(75) Inventors: Masahiko Tsukuda, Osaka (JP); Morio Tomiyama, Nara (JP)

(73) Assignee: Panasonic Corporation, Osaka (JP)

(*) Notice: Subject to any disclaimer, the term of this patent is extended or adjusted under 35 U.S.C. 154(b) by 128 days.

(21) Appl. No.: 13/131,983

(22) PCT Filed: Oct. 1, 2010

(86) PCT No.: PCT/JP2010/005909
§ 371 (c)(1),
(2), (4) Date: May 31, 2011

(87) PCT Pub. No.: WO2011/043043
PCT Pub. Date: Apr. 14, 2011

(65) Prior Publication Data
US 2011/0229679 A1 Sep. 22, 2011

(30) Foreign Application Priority Data
Oct. 6, 2009 (JP) .................. 2009-232343

(51) Int. Cl.
*G11B 7/24* (2006.01)
(52) U.S. Cl.
USPC .................... 428/64.1; 428/64.4; 430/270.11; 264/496
(58) Field of Classification Search
USPC .......................................... 428/64.4; 264/496
See application file for complete search history.

(56) References Cited

U.S. PATENT DOCUMENTS

| | | | |
|---|---|---|---|
| 7,143,426 B2 | 11/2006 | Mishima et al. | |
| 2004/0139459 A1 | 7/2004 | Mishima et al. | |
| 2005/0007924 A1* | 1/2005 | Nishiuchi et al. | 369/53.2 |

FOREIGN PATENT DOCUMENTS

| | | |
|---|---|---|
| JP | 2002-92969 | 3/2002 |
| JP | 2004-213720 | 7/2004 |
| JP | 2007-280508 | 10/2007 |
| JP | 2008-41152 | 2/2008 |
| JP | 2008-71441 | 3/2008 |
| JP | 2008-194980 | 8/2008 |
| JP | 2008-276919 | 11/2008 |
| JP | 2008-276920 | 11/2008 |

OTHER PUBLICATIONS

International Search Report issued Nov. 2, 2010 in International (PCT) Application No. PCT/JP2010/005909.

* cited by examiner

*Primary Examiner* — Elizabeth Mulvaney
(74) *Attorney, Agent, or Firm* — Wenderoth, Lind & Ponack, L.L.P.

(57) ABSTRACT

A method for manufacturing an information recording medium including N information layers, (N−1) intermediate layers interposed between the information layers and a protective layer laminated on the Nth information layer placed on a substrate formed with a first reference point, including: forming the information layer on the substrate; repeating (N−1) times a process of applying radiation curable resin on the information layer, a process of affixing a transfer stamper formed with a second reference point to the radiation curable resin, a process of curing the radiation curable resin by irradiation, and a process of forming the intermediate layer by peeling the transfer stamper at an interface with the radiation curable resin, in order to form the (N−1) information layers and the (N−1) intermediate layers and thereafter form the Nth information layer; and forming the protective layer on the Nth information layer, wherein in the process of affixing the transfer stamper to the radiation curable resin, the transfer stamper is affixed so that the second reference point of the transfer stamper is each time at a different position with respect to the first reference point of the substrate.

10 Claims, 16 Drawing Sheets

DURING FORMATION OF FIRST INTERMEDIATE LAYER

DURING FORMATION OF SECOND INTERMEDIATE LAYER

MANUFACTURING METHOD OF INFORMATION RECORDING MEDIUM AND INFORMATION RECORDING MEDIUM

TECHNICAL FIELD

The present invention relates to an information recording medium for reply or record/reply including a laminated curable resin layer, and to a method for manufacturing the same. More specifically, the present invention relates to a method for manufacturing an information recording medium having three or more information layers, and to an information recording medium manufactured by the foregoing manufacturing method.

BACKGROUND ART

Information recording media for industrial use and consumer use have been broadly used as a result of advance in research for optical information recording technologies in recent years. In particular, optical information recording media such as CDs and DVDs capable of recording information with greater density become popular. Such an optical information recording medium includes a transparent substrate formed with an information surface having a concavo-convex shape such as pits representing information signals and guide grooves for tracking recording/reply light, an information layer (for example, laminated metal film or laminated thermally recordable thin film material) formed on the transparent substrate, and a protective layer (for example, resin layer or transparent substrate) for protecting the information layer from, for example, moisture in the atmosphere. Information is replayed by detection of changes in an amount of reflected light of a laser beam irradiated on the information layer.

For example, in the case of CDs, a resin substrate of approximately 1.1 mm in thickness is prepared. A concavo-convex information surface is formed on one surface of the resin substrate. A metal thin film or a thin film material is laminated on the resin substrate to form an information layer. Subsequently, radiation curable resin such as ultraviolet curable resin is coated to form a protective layer, so that a CD is thereby produced. Information signals are replayed by a laser beam which enters from the substrate side, and not the protective layer side.

In the case of DVDs, a resin substrate of approximately 0.6 mm in thickness is prepared. A concavo-convex information surface is formed on the resin substrate. A metal thin film or a thin film material is laminated on the resin substrate to form an information layer. Subsequently, a separately prepared resin substrate of approximately 0.6 mm in thickness is affixed by using resin such as ultraviolet curable resin, so that a DVD is thereby produced.

There are more demands for an increase in capacity of the foregoing optical information recording media. In order to meet the foregoing demands, DVDs with multi-information layers have been proposed. Such a DVD comprises a dual information layer, and an intermediate layer of approximately several ten μm in thickness formed between the information layers.

In addition, there are more needs for next-generation optical information recording media with greater density and higher capacity than DVDs according to diffusion of digital high definition broadcasts in recent years. High-capacity media such as Blu-ray discs have been proposed as such a next-generation of optical information recording media. Such a high-capacity medium includes a substrate of 1.1 mm in thickness with a concavo-convex information surface, an information layer formed by laminating, for example, a metal thin film on the information surface of the substrate, and a protective layer of approximately 0.1 mm in thickness formed on the information layer. A Blu-ray disc has a narrower track pitch of the information and smaller pits than a DVD. Thus, a spot of a laser beam for recording/replaying information needs to be sharply narrowed on the information layer. A shorter wavelength of blue-violet laser beam (wavelength: 405 nm) is used for replaying a Blu-ray disc. An optical head comprising an objective lens with a numerical aperture (NA) of 0.85 is also used to narrow down the spot of the laser beam on the information layer. If the size of the spot decreases, however, it becomes more sensitive to tilt of the disc. Even slight tilt of the disc causes an aberration of the beam spot. The aberration of the beam spot results in strain in the narrowed beam, so that there are problems such as poor record/reply. In order to overcome the foregoing drawbacks, in the case of a Blu-ray disc, thickness of the protective layer, which is disposed on the laser incident side of the disc, is set to be extremely thin (approximately 0.1 mm).

Like DVDs, an increase in memory capacity has been also proposed for the next-generation of information recording media with high capacity such as a Blu-ray disc.

FIG. 13 is a schematic cross sectional view of a dual-layered Blu-ray disc including two information layers. A dual-layered Blu-ray disc is now described with reference to FIG. 13.

A molded resin substrate 201 is prepared. A concavo-convex first information surface 202 is formed on one surface of the molded resin substrate 201. A metal thin film or a thermally recordable thin film is laminated on the first information surface 202 to form a first information layer 203. A resin layer 204, which is substantially transparent to recording/reply light, is formed on the first information layer 203. A concavo-convex second information surface 205 is formed on the resin layer 204. A metal thin film which is translucent to recording/reply light or a thermally recordable thin film material is laminated on the second information surface 205 to form a second information layer 206. Resin, which is substantially transparent to recording/reply light, is coated so as to cover the second information layer 206 to form a protective layer 207. It should be noted that the term "substantially transparent" as used herein means that the layer has transmittance approximately at 90% or greater for the recording/reply light. In addition, the term "translucent" as used herein means that the layer has transmittance from 10% to 90% for the recording/reply light. A laser beam enters from the side of the protective layer 207 of the dual-layered Blu-ray disc. The focal point of the laser beam is focused on one information layer of the first and second information layers 203, 206, which works for record/reply, so that signals are recorded and/or replayed. It should be noted that the molded resin substrate 201 is approximately 1.1 mm in thickness. In addition, the resin intermediate layer (resin layer 204) is set to approximately 25 μm in thickness. The protective layer 207 is set to approximately 75 μm in thickness.

FIGS. 14A to 14F schematically show a process of producing a stamper which is used as a metal mold for producing the molded resin substrate 201 of the information recording medium. A standard manufacturing method of the foregoing dual-layered Blu-ray disc is now described with reference to FIGS. 13 and 14. It should be noted that principles of the manufacturing method of the dual-layered Blu-ray disc described below may be applied to a multi-layered Blu-ray disc comprising three or more information layers.

As shown in FIG. 14A, a photosensitive material such as a photoresist is applied on a master disk 301 made from a material such as a glass disk or silicon wafer to form a photosensitive film 302. Subsequently, an exposure beam 303 such as a laser beam or electron beam is irradiated on the photosensitive film 302 to perform exposure of patterns such as pits and guide grooves. Meanwhile, character information in the inner circumferential part with an aggregate of pits or grooves is exposed for identification of the master disk 301.

In FIG. 14B, hatched areas in the photosensitive film 302 are the exposed portions 304 which have been exposed with the exposure beam 303. A latent image is formed from the exposed portion 304 by the irradiation of the exposure beam 303 to the photosensitive film 302 described with reference to FIG. 14A.

As shown in FIG. 14C, subsequently, developer such as alkali developer is used to eliminate the exposed portion 304 and make a recording master disk 306 including the master disk 301 and a concavo-convex pattern 305 formed with a photosensitive material on the master disk 301. Meanwhile, the exposed character information is formed as visible characters on the master disk 301.

As shown in FIG. 14D, subsequently, a layering technique for a thin film such as a sputtering or deposition method is used to form a conductive thin film 307 on a surface of the recording master disk 306.

As shown in FIG. 14E, subsequently, a metal plate 308 is formed by a method such as metal plating in which the conductive thin film 307 works as an electrode.

As shown in FIG. 14F, a laminate including the conductive thin film 307 and the metal plate 308 is peeled at an interface between the pattern 305 (photosensitive film 302) and the conductive thin film 307. The photosensitive material remaining on the surface of the conductive thin film 307 is removed with, for example, remover. Subsequently, the laminate is punch-molded into a disk, which is used as a metal stamper 309, so that the inner/outer diameter of the disk is fitted to a molding machine. The metal stamper 309 is thereafter used as a metal mold for molding a resin substrate.

Subsequently, the metal stamper 309 is used to mold a resin substrate by a resin molding method such as an injection molding process. Character information formed on an inner circumferential part of the metal stamper 309 is also transferred to the resin substrate. Typically, the metal stamper 309 is substantially consistently positioned with respect to the molding machine configured to mold the resin substrate. For example, the metal stamper 309 is mounted on the molding machine so that the character information formed on the metal stamper 309 is located at the top position. As a result, recording position of the character information always indicates the top direction of the molding machine. In the ensuing embodiments, a start position of the character information on the substrate is exemplified as the first reference point of the substrate.

A more moldable material such as polycarbonate is typically used as a resin substrate material. Subsequently, resin layers are laminated by a formation process of the resin layers such as a spin coating method as shown in Patent Document 1.

FIGS. 15A to 15I show a process for producing a dual-layered Blu-ray disc including processes for producing a resin intermediate layer (the resin layer 204) and the protective layer 207 according to a spin coating method. The process for producing a dual-layered Blu-ray disc is now described with reference to FIGS. 13 to 15.

Using the metal stamper 309 obtained through the processes described with reference to FIGS. 14A to 14F, the molded resin substrate 201 of approximately 1.1 mm in thickness is formed by a resin molding method such as an injection molding process. As described above, the concavo-convex first information surface 202 including pits and guide grooves is formed on one surface of the molded resin substrate 201. The first information layer 203 is formed on the first information surface 202 using a metal thin film or a thermally recordable thin film material by a sputtering or deposition method. As shown in FIG. 15A, the molded resin substrate 201 formed with the first information layer 203 is fixed on a rotatable stage 403 by a vacuum contact method and alike.

As shown in FIG. 15B, radiation curable resin A 404 is concentrically applied by a dispenser on an intended radius of the first information layer 203 of the molded resin substrate 201 fixed to the rotatable stage 403.

As shown in FIG. 15C, the rotatable stage 403 spins so that the radiation curable resin A 404 on the first information layer 203 is stretched and becomes a resin layer 406. The thickness of the resin layer 406 is controlled to become an intended value by adjustment of various parameters such as viscosity of the radiation curable resin A 404, spin speed, spin time, ambient atmosphere (for example, temperature and humidity) around the radiation curable resin A 404 during the spin, and so on. After stopping the spin, radiation is irradiated on the resin layer 406 from an irradiating apparatus 405 to cure the resin layer 406.

A transfer stamper 407 configured to form a second information surface 205 is prepared. The transfer stamper 407 may be molded, for example, by an injection molding process using the metal stamper obtained through the same processes as the series of the processes for producing the metal stamper 309 for use in molding the molded resin substrate 201 described with reference to FIG. 14F. Like the molded resin substrate 201, character information is also recorded at an inner circumferential part of the transfer stamper 407. In the embodiments described below, recording start position of the character information of the transfer stamper 407 is exemplified as the second reference point of the transfer stamper.

As shown in FIG. 15D, the transfer stamper 407 is fixed onto the rotatable stage 408 by a vacuum contact method and alike. Radiation curable resin B 409 is concentrically applied on an intended radius of the transfer stamper 407 on the rotatable stage 408 by a dispenser.

As shown in FIG. 15E, the rotatable stage 408 spins so that the radiation curable resin B 409 on the transfer stamper 407 is stretched to form a resin layer 411. Thickness of the resin layer 411 is controlled to become an intended dimension by controlling various parameters, similarly to the thickness control of the resin layer 406 described above. After stopping the spin of the rotatable stage 408, radiation is irradiated on the resin layer 411 from an irradiating apparatus 410 to cure the resin layer 411.

As shown in FIG. 15F, the molded resin substrate 201 formed on the resin layer 406 is fixed on the rotatable stage 413. Then, the transfer stamper 407 on which the resin layer 411 is formed is superposed on the molded resin substrate 201 on a rotatable stage 413 with interposing the radiation curable resin C 412. It should be noted that the transfer stamper 407 is integrated with the molded resin substrate 201 so that the resin layer 411 faces the resin layer 406.

As shown in FIG. 15G, the rotatable stage 413 supporting the integrated object of the molded resin substrate 201 and transfer stamper 407 spins so that the radiation curable resin C 412 is stretched under the control for an intended thickness of a resin layer 414 to be formed. Subsequently, an irradiating apparatus 415 irradiates radiation to cure the resin layer 414, so that the transfer stamper 407 is affixed to the molded resin substrate 201.

As shown in FIG. 15H, after the integration of the molded resin substrate 201 and the transfer stamper 407 by curing the layer of the radiation curable resin C 412, the transfer stamper 407 is peeled at the interface between the transfer stamper 407 and the resin layer 411, so that the second information surface 205 is formed on the molded resin substrate 201. The laminate of the resin layers 411, 414, 406 corresponds to the resin layer 204 described with reference to FIG. 13.

As shown in FIG. 15I, the second information layer 206 is formed on the second information surface 205 using a metal thin film or a thermally recordable thin film material according to a layering technique for a thin film such as a sputtering or deposition method. Subsequently, radiation curable resin D is applied on the second information layer 206 and subjected to a spin coating method, similarly to the formation methods of the resin layers 406, 411, 414. After the radiation curable resin D is stretched, radiation is irradiated to form cured protective layer 207. Optionally, a hard coat layer may be formed on the protective layer 207 to prevent defects such as scratches and fingerprints on the surface of the protective layer 207. A dual-layered Blu-ray disc is thereby completed. It should be noted that the radiation curable resin A 404 described with reference to FIGS. 15A to 15I preferably possesses favorable adhesiveness with the first information layer 203 and/or the resin layer 414. Meanwhile, preferably the radiation curable resin B 409 is more exfoliative from the transfer stamper 407 and possesses favorable adhesiveness with the resin layer 414. In addition, the radiation curable resin A 404, the radiation curable resin B 409, the radiation curable resin C 412 and the radiation curable resin D are substantially transparent to wavelength of the recording/replay light. In the processes described with reference to FIGS. 15A to 15I, three types of radiation curable resins are used to form the resin intermediate layer (resin layer 204). However, for example, by appropriately selecting a material of the transfer stamper 407, fewer types of radiation curable resin may be used to appropriately control the peel-off of the transfer stamper 407 from the resin layer 204. Such a simplified method may also be suitably applied to the embodiments described below.

Patent Document 2 proposes a four-layered structured information recording medium including four information layers. Each of the resin intermediate layers in the four-layered structure information recording medium is different in thickness in order to moderate interference with the other layers. The thickness of the resin intermediate layer formed by a spin coating method is controlled to become an intended value by adjustment of various parameters such as viscosity of radiation curable resin, spin speed, spin time, ambient atmosphere (for example, temperature and humidity) around the radiation curable resin during the spin, and so on. In conventional technologies, a spin coating method is generally used for forming resin layers different in thickness like the four-layered structure information recording medium.

Higher capacity of Blu-ray discs is also demanded. For example, media including three information layers to achieve a capacity of 100 GB and media including four information layers to achieve a capacity of 128 GB have been proposed.

Multi-layering of two or more layers is achieved by repeating, several times, the process of forming the intermediate layer (resin layer 411) to the process of forming the second information layer 206 described with reference to FIGS. 15A to 15I. Several information layers are sequentially laminated as a result of repeating a series of the foregoing processes.

FIG. 16 is a schematic cross sectional view of a multi-layered structure of a Blu-ray disc medium obtained by repeating, several times, the process of forming the intermediate layer (resin layer 411) to the process of forming the second information layer 206 described with reference to FIGS. 15A to 15I. Drawbacks of the multi-layered structure medium are now described with reference to FIG. 16.

A medium 500 shown in FIG. 16 includes a substrate 501 of approximately 1.1 mm in thickness, and several information layers 502, 503, 504, 505 laminated on the substrate 501. In FIG. 16, a reference numeral "502" represents a first information layer which is the closest to the substrate 501. A reference numeral "503" represents a second information layer laminated on the first information layer 502 with interposing a resin layer. A reference numeral "504" represents a third information layer laminated on the second information layer 503 with interposing a resin layer. A reference numeral "505" represents an Nth information layer as the Nth layer far from the substrate 501. The first, second, third and Nth information layers 502, 503, 504, 505 are sequentially laminated toward the incident surface of recording/reply light 506. The medium 500 additionally comprises a protective layer 507 which covers the Nth information layer. The surface of the protective layer 507 becomes the incident surface of the recording/reply light 506.

All information layers 502, 503, 504, 505 in the multi-layered structure medium 500 are formed within a thickness dimension of approximately 0.1 mm from the surface of the protective layer 507 in order to moderate influence from tilt of the disc as described above. This means that, as shown in FIG. 16, the distance from the surface of the protective layer 507 to the farthest first information layer 502 from the protective layer 507 is limited to approximately 0.1 mm.

In order to achieve storage capacities demanded in three-layered media and four-layered media, higher storage capacity per information layer than conventional two-layered media has been proposed. A conventional two-layered medium has a capacity of 25 GB per information layer (that is, a total of 50 GB with two layers). For example, in order to achieve a capacity of 100 GB with a three-layered medium, a capacity of 33.4 GB is required per information layer. In addition, in order to achieve a capacity of 128 GB in a four-layered medium, a capacity of 32 GB is required per information layer.

In terms of compatibility of pickups and systems used in conventional BD media, it is undesirable to change guide grooves or pitches (track pitches). Accordingly, it is necessary to increase a line density in order to increase the capacity per information layer.

The increase in the line density results in shorter signal marks. As a result, deterioration in quality of the record/reply by a change in thickness of a protective layer and intermediate layers becomes more apparent than the density of 25 GB per information layer in a conventional two-layered medium. Accordingly, thickness dimensions from the surface of the protective layer to the respective information layers in multi-layered structure media have to be much more precise than a conventional medium with a density of 25 GB.

However, as a number of laminated resin layers increases from a conventional two-layered structure to three layers, four layers or more layers, variation in thickness from the surface of the protective layer to the respective information layers increases according to the process described with reference to FIGS. 15A to 15I.

Patent Document 1: Japanese Patent Application Laid-open No. 2002-092969

Patent Document 2: Japanese Patent Application Laid-open No. 2004-213720

SUMMARY OF THE INVENTION

An object of the present invention is to reduce variation in thickness from a surface of a protective layer to respective information layers, which is likely to increase due to lamination of resin layers in a multi-layered medium, and thereby achieve less deterioration in quality of record/reply.

A method for manufacturing an information recording medium including N information layers (where N is an integer of 3 or more), (N−1) intermediate layers interposed between the information layers and a protective layer laminated on the Nth information layer which are placed on a substrate formed with a first reference point according to one aspect of the present invention comprises a process of forming the information layer on the substrate; a process of repeating, (N−1) times, a process of applying radiation curable resin on the information layer, a process of affixing a transfer stamper formed with a second reference point to the radiation curable resin, a process of curing the radiation curable resin by irradiation, and a process of forming the intermediate layer by peeling the transfer stamper at an interface with the radiation curable resin, in order to sequentially form the (N−1) information layers and the (N−1) intermediate layers and thereafter form the Nth information layer; and a process of forming the protective layer on the Nth information layer, wherein in the process of affixing the transfer stamper to the radiation curable resin, the transfer stamper is affixed so that the second reference point of the transfer stamper is each time at a different position with respect to the first reference point of the substrate.

An information recording medium according to another aspect of the present invention comprises a substrate; N information layers (N is an integer of 3 or more) formed on the substrate; (N−1) intermediate layers interposed between the information layers; and a protective layer, wherein a first reference point is formed on the substrate, a second reference point is formed on each of the intermediate layers, and a position of the second reference point with respect to the first reference point is different for each of the intermediate layers.

DETAILED DESCRIPTION OF THE INVENTION

Figure 1:
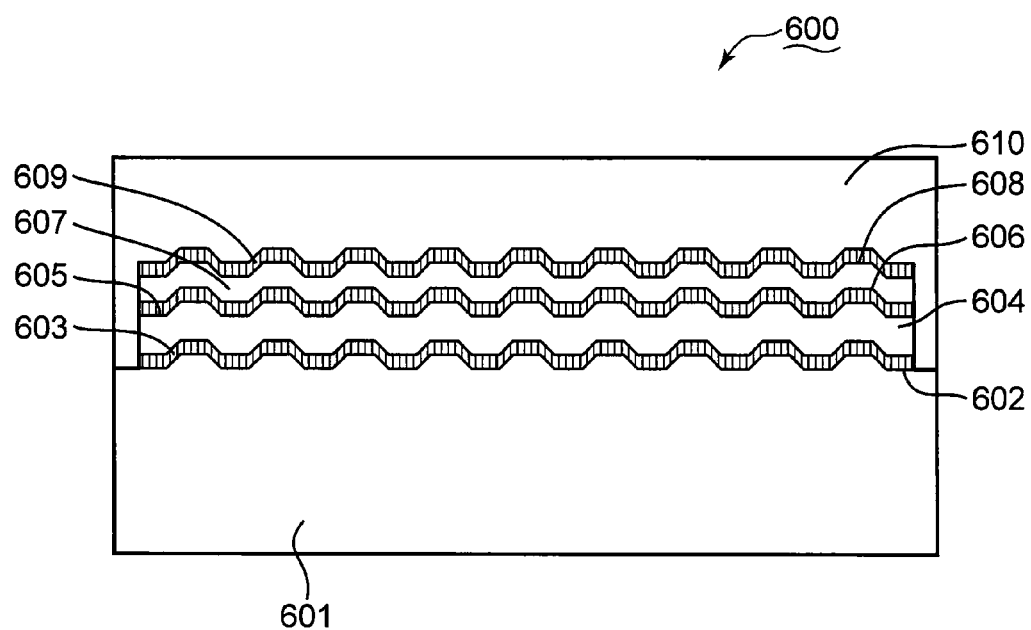
FIG. 1 is a schematic cross sectional view of a three-layered Blu-ray disc exemplified as an information recording medium according to one embodiment.

A method for manufacturing an information recording medium and the information recording medium according to one embodiment of the present invention are now described with reference to the accompanying drawings. It should be noted that the same reference numerals are given to the same constituent elements in the embodiments described below. In addition, redundant descriptions are omitted as necessary to make the descriptions clearer. The configuration, arrangement or shape shown in the drawings and descriptions in the context of the drawings are merely intended for facilitating to make principles of the ensuing embodiments understood, so that the principles described with reference to the ensuing embodiments are not limited thereto in any way.

(Information Recording Medium)

FIG. 1 is a schematic cross sectional view of an information recording medium. In this embodiment, a three-layered Blu-ray disc comprising three information layers is exemplified as a three-layered information recording medium. Alternatively, any information recording medium may also be a multi-layered information recording comprising more than three information layers. The principles of the three-layered information recording medium described below may also be suitably applied to such a multi-layered information recording medium.

A three-layered Blu-ray disc 600 comprises a substrate 601. The substrate 601 includes a concavo-convex first information surface 602. The three-layered Blu-ray disc 600 further comprises a first information layer 603 including a metal thin film or a thermally recordable thin film material, which is laminated on the first information surface 602. In this embodiment, the first information surface 602 is exemplified as a first surface.

The three-layered Blu-ray disc 600 further comprises a first intermediate layer 604 formed on the first information layer 603. The first intermediate layer 604, which is substantially transparent to recording/reply light, includes a concavo-convex second information surface 605. The three-layered Blu-ray disc 600 further comprises a second information layer 606 including a metal thin film or a thermally recordable thin film material, which is laminated on the second information surface 605.

The three-layered Blu-ray disc 600 further comprises a second intermediate layer 607 formed on the second information layer 606. The second intermediate layer 607, which is substantially transparent to the recording/reply light, includes a concavo-convex third information surface 608. The three-layered Blu-ray disc 600 further comprises a third information layer 609 including a metal thin film or a thermally recordable thin film material, which is laminated on the third information surface 608.

The three-layered Blu-ray disc 600 includes a protective layer 610 which covers the third information layer 609. The protective layer 610 includes resin, which is substantially transparent to the recording/reply light and coats the third information layer 609. As described above, in this embodiment, three information layers (the first, second and third information layers 603, 606, 609) are formed on the substrate 601. Alternatively, N information layers (N is an integer of 3 or more) may be formed on the substrate 601. In this embodiment, two intermediate layers (the first and second intermediate layers 604, 607) for separating the three information layers (the first, second and third information layers 603, 606, 609) are also formed on the substrate 601. Alternatively, if N information layers (N is an integer of 3 or more) are formed on the substrate 601, (N−1) intermediate layers are formed.

The term "substantially transparent" as used herein means that the layer has transmittance approximately at 90% or greater for the recording/reply light. The term "translucent" as used herein means that the layer has transmittance from 10% to 90% for the recording/reply light.

A laser beam used as the recording/reply light enters the three-layered Blu-ray disc 600 through the protective layer 610. The focal point of the laser beam entered the three-layered Blu-ray disc 600 is focused on one (a target layer for recording or reply) of the first, second and third information layers 603, 606, 609. As a result, signals are recorded and/or replayed on/from the information layer (the first, second and third information layers 603, 606, 609) on which the focal point is focused. In this embodiment, the substrate 601 is set to approximately 1.1 mm in thickness. The first and second intermediate layers 604, 607 are set to approximately 25 μm and approximately 18 μm in thickness, respectively. The protective layer 610 is set to approximately 57 μm in thickness. Alternatively the first and second intermediate layers 604, 607 and the protective layer 610 may be set to other dimensions in thickness, respectively.

The substrate 601 is configured to be compatible in terms of shape with optical discs such as CDs and DVDs. The substrate 601 may be, for example, ϕ120 mm in outer diameter and 1.0 mm to 1.1 mm in thickness and have a center hole of ϕ15 mm in diameter. The substrate 601 may be a circular disc typically made of polycarbonate or acrylic resin.

The substrate 601 may be also formed using the metal stamper 309 described with reference to FIGS. 14A to 14F by any appropriate resin molding technique such as an injection molding process. As a result, the first information surface 602 is formed so that the first information surface 602 includes guide grooves formed in a concavo-convex shape according to the pattern 305 defined in the manufacturing process of the metal stamper 309. Visible character information is also recorded at an inner circumferential part of the substrate 601. Accordingly, a serial number of the substrate 601 may be visualized. In this embodiment, a start position of the character information is exemplified as the first reference point of the substrate 601. In this embodiment, the substrate 601 is produced using polycarbonate.

If the information recording medium is a read-only medium, the first information layer 603 has at least characteristics for reflecting the reply light. The first information layer 603 is formed from a reflective material such as Al, Ag, Au, Si, $SiO_2$, or $TiO_2$ by a sputtering or deposition method and alike.

If the information recording medium is a recordable medium, information is recorded in the first information layer 603 by irradiation of the recording light. Accordingly, the first information layer 603 at least includes a layer made of a recordable material (for example, a phase-change material such as GeSbTe or organic dye such as phthalocyanine). Optionally, the first information layer 603 may include a layer configured to enhance record/reply characteristics, such as a reflective layer or an interface layer.

The second and third information layers 606, 609 are formed in the same manner as the first information layer 603. As described above, the record/reply to/from the three-layered Blu-ray disc 600 are performed with a laser beam, which enters the information layer (the first, second or third information layers 603, 606, 609) from the protective layer 610. Accordingly, the second and third information layers 606, 609 have greater transmittance for wavelength of the recording/reply light to allow the record/reply to/from the first information layer 603. Similarly, the third information layer 609 has much greater transmittance for the wavelength of the record/reply light to allow the record/reply to/from the second information layer 606.

The first and second intermediate layers 604, 607 are configured to be substantially transparent to the recording/reply light. For example, radiation curable resin such as acrylic-based ultraviolet curable resin and epoxy-based ultraviolet curable resin is preferably used for forming the first and second intermediate layers 604, 607. The term "substantially transparent" as used herein means that the layer has transmittance of 90% or greater for the recording/reply light. The first and second intermediate layers 604, 607 are preferably formed from a material with transmittance of 95% or greater.

(Method of Manufacturing Information Recording Medium)

The aforementioned substrate 601 is molded using the metal stamper 309 described with reference to FIGS. 14A to 14F according to any appropriate molding technique such as an injection molding process. The first information layer 603 is also molded using any appropriate layering technique such as sputtering and deposition.

The method for producing the first intermediate layer 604 comprises a process of applying liquid radiation curable resin on the first information layer 603 according to any appropriate application method such as a spin coating method. The thickness of the first intermediate layer 604 is controlled to become an intended value by adjustment of various parameters such as viscosity of the radiation curable resin, spin speed, spin time, ambient atmosphere (for example, temperature and humidity) around the radiation curable resin during the spin, and so on.

The method for producing the first intermediate layer 604 further includes a process of using a transfer stamper including an information surface with pits and guide grooves to transfer the information surface to the radiation curable resin for forming the first intermediate layer 604. As a result of transferring the information surface of the transfer stamper, the second information surface 605 is formed. It should be noted that the transfer stamper is molded according to any appropriate molding technique such as an injection molding process by using the stamper formed through a similar process to the metal stamper 309 described with reference to FIGS. 14A to 14F. The second intermediate layer 607 is formed through substantially the same process as the first intermediate layer 604.

FIGS. 2A to 2D depicts the transfer process of the information surface of the transfer stamper to the first intermediate layer 604. It should be noted that principles described with reference to FIGS. 2A to 2D may be similarly applied to a transfer process of an information surface of a transfer stamper to the second intermediate layer 607. The process for transferring the information surface of the transfer stamper to the first intermediate layer 604 is now described with reference to FIGS. 1 to 2D.

Figure 2A:
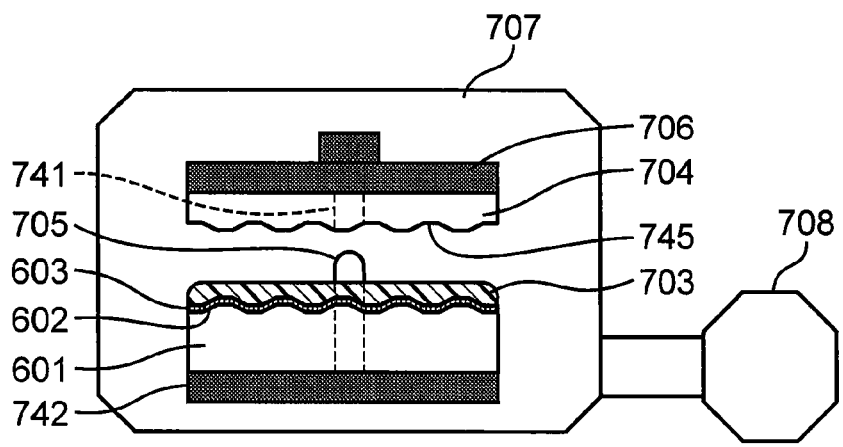
FIGS. 2A to 2D schematically shows a layering process of intermediate layers for manufacturing the three-layered Blu-ray disc shown in FIG. 1.

As described above, radiation curable resin 703 is applied on the first information layer 603 formed on the first information surface 602 of the substrate 601. As shown in FIG. 2A, after the application of the radiation curable resin 703 is complete, the substrate 601 is carried into a vacuum chamber 707. The transfer stamper 704 is also disposed in the vacuum chamber 707.

The transfer stamper 704 is formed from a material (for example, polyolefin or polycarbonate), which is preferably peeled from the radiation curing resin. The transfer stamper 704 is thinner than the substrate 601. For example, the transfer stamper 704 may be 0.6 mm in thickness. A difference in thickness from the substrate 601 results in a difference in rigidity between the transfer stamper 704 and the substrate 601. The transfer stamper 704 warps due to the difference in rigidity when the transfer stamper 704 is peeled from the substrate 601 of 1.1 mm in thickness, which facilitates for the transfer stamper 704 to be peeled off.

Like the substrate 601, it is preferable to use resin material such as polyolefin and polycarbonate for the transfer stamper 704 including pits and guide grooves. An information surface may be easily formed on one surface of the transfer stamper 704 according to a method such as an injection molding process using a metal stamper.

In addition, the resin material such as polyolefin and polycarbonate has high transmittance for radiation such as ultraviolet rays. Accordingly, the radiation curable resin 703 efficiently cures because of irradiating radiation through the transfer stamper 704.

Figure 2B:
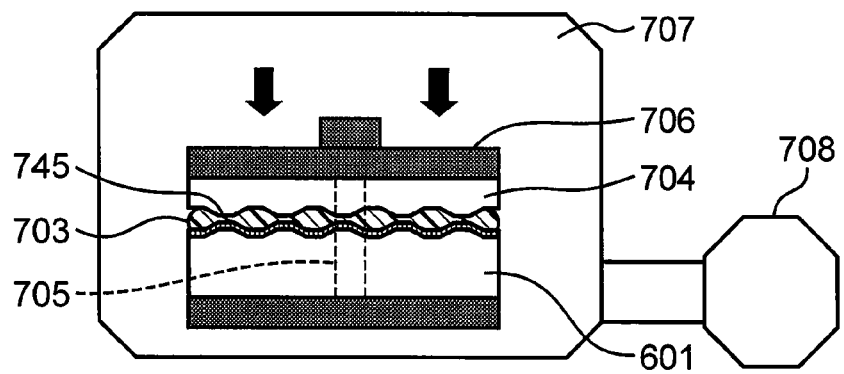

A center hole 741 is formed in the center of the transfer stamper 704. A support base 742 configured to support the substrate 601 comprises a center boss 705. The center boss 705 standing upright from the support base 742 is inserted into the center hole of the substrate 601, and protrudes toward the transfer stamper 704. As shown in FIGS. 2A and 2B, the tip of the center boss 705 is inserted into the center hole 741 of the transfer stamper 704. As a result, the transfer stamper 704 becomes concentric with the substrate 601.

Like the substrate 601, character information is recorded at an inner circumferential part of the transfer stamper 704. In this embodiment, a start position of the character information recorded at the inner circumferential part of the transfer stamper 704 is exemplified as the second reference point of the transfer stamper.

A vacuum pump 708 such as a rotary pump or a turbo molecular pump evacuates air in the vacuum chamber 707. As a result, the inside of the vacuum chamber 707 quickly becomes vacuum atmosphere. In this embodiment, when the pressure in the vacuum chamber 707 reaches a degree of vacuum of 100 Pa or less, the transfer stamper 704 is superposed on the substrate 601 (refer to FIG. 2B). A pressure plate 706 above the transfer stamper 704 pressurizes the transfer stamper 704 toward the substrate 601. As a result, the information surface 745 of the transfer stamper 704 is transferred to the radiation curable resin 703. Since the inside of the vacuum chamber 707 is high vacuum atmosphere, the transfer stamper 704 is affixed to the radiation curable resin 703 without entrainment of any air bubbles in between the radiation curable resin 703 and the transfer stamper 704.

Figure 2C:
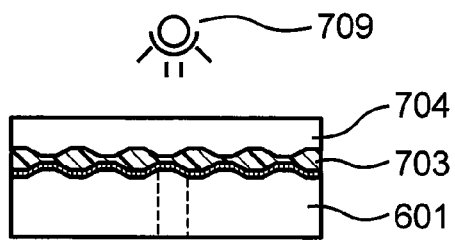

As shown in FIG. 2C, the substrate 601 to which the transfer stamper 704 has been affixed is removed from the vacuum chamber 707. Subsequently, an irradiating apparatus 709 irradiates radiation through the transfer stamper 704 to cure the radiation curable resin 703.

Figure 2D:
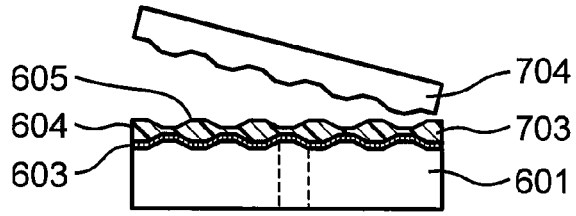

As shown in FIG. 2D, then, the transfer stamper 704 is peeled off at the interface with the radiation curable resin 703. It may be achieved by knocking a wedge into the interface between the transfer stamper 704 and the radiation curable resin 703 to peel the transfer stamper 704 off. Alternatively, the transfer stamper 704 may be peeled from the radiation curable resin 703 by blowing compressed air into the interface between the transfer stamper 704 and the radiation curable resin 703. As a result of peeling the transfer stamper 704, the laminated first intermediate layer 604 is formed on the first information layer 603. The second information surface 605 is also formed on the upper surface of the first intermediate layer 604.

As described above, the second information layer 606 is formed on the second information surface 605 according to any appropriate layering technique such as sputtering or deposition. After radiation curable resin is applied on the second information layer 606, the substrate 601 is carried into the vacuum chamber once again. After the inside of the vacuum chamber becomes vacuum atmosphere, a transfer stamper is affixed to the radiation curable resin. Subsequently, irradiation is performed via the transfer stamper, so that the radiation curable resin cures on the second information layer 606. After the radiation curable resin cures, the transfer stamper is peeled from the layer of the cured radiation curable resin to form the second intermediate layer 607. The third information surface 608 is formed on the upper surface of the second intermediate layer 607. The third information layer 609 is formed on the third information surface 608 according to any appropriate layering technique such as sputtering or deposition.

Like the transfer stamper 704 used for forming the substrate 601 and the first intermediate layer 604, character information is also recorded at an inner circumferential part of the transfer stamper used for forming the second intermediate layer 607. In this embodiment, a start position of the character information recorded at the inner circumferential part of the transfer stamper used for forming the second intermediate layer 607 is also exemplified as the second reference point of the transfer stamper. A start position of the character information transferred to the first and second intermediate layers 604, 607 is also exemplified as the second reference point.

As described above, in the production of the three-layered Blu-ray disc 600, the process of forming the information layer, the process of applying radiation curable resin on the information layer, the process of affixing the transfer stamper to the radiation curable resin, the process of curing the radiation curable resin by irradiation, and the process of peeling the transfer stamper at the interface with the radiation curable resin to form the intermediate layer are repeated twice, so that two information layers (the first and second information layers 603, 606) and two intermediate layers (the first and second intermediate layers 604, 607) are sequentially formed. Subsequently, the third information layer 609 is formed.

Upon producing an N-layered Blu-ray disc comprising N information layers, the foregoing series of processes are repeated, (N−1) times, so that (N−1) information layers and (N−1) intermediate layers are sequentially formed. Subsequently, the Nth information layer is formed. Character information is recorded at an inner circumferential parts of each transfer stamper, which is used in forming each of the (N−1) intermediate layers. Accordingly, character information of each transfer stamper is recorded in each of the (N−1) intermediate layers.

The protective layer 610 and the method for producing the protective layer 610 are now described by referring to FIG. 1 once again.

The protective layer 610 is formed from a material which is substantially transparent to the recording/reply light (for example, radiation curable resin such as acrylic-based ultraviolet curable resin and epoxy-based ultraviolet curable resin). The term "substantially transparent" as used herein means that the layer has transmittance approximately at 90% or greater for the recording/reply light. The protective layer 610 is preferably formed from a material with transmittance of 95% or greater.

After the third information layer 609 is formed, the protective layer 610 is formed. As a method for forming the protective layer 610, various methods may be used; for instance, a spin coating method, a screen printing method, a gravure method, an inkjet method and so on. Alternatively, instead of coating the radiation curable resin, a sheet-like material may be affixed to the third information layer 609 with adhesive. The sheet-like material may be formed, for example, from polycarbonate resin or acrylic resin.

A blue-violet laser beam of 405 nm in wavelength is used as the record/reply to/from the three-layered Blu-ray disc 600 according to this embodiment. The blue-violet laser beam entering from the protective layer 610 is focused on one information layer selected from the first, second and third information layers 603, 606, 609 using an objective lens with a numerical aperture (NA) of 0.85. In order to moderate influence from tilt of the three-layered Blu-ray disc 600, the thickness from the surface of the protective layer 610 to the first information layer 603 is set to approximately 0.1 mm. Alternatively, the thickness from the surface of the protective layer 610 to the first information layer 603 may be set to another dimension. The principle according to this embodiment may be suitably applicable, independently of the thickness from the surface of the protective layer 610 to the first information layer 603.

The foregoing description is an overall outline of the configuration of the three-layered Blu-ray disc 600 exemplified as the multi-layered information recording medium, and the method for manufacturing the three-layered Blu-ray disc 600. This embodiment is characterized in the formation of the intermediate layers (the first and second intermediate layers 604, 607). Accordingly, the descriptions on the configuration of the multi-layered information recording medium and the method for manufacturing the multi-layered information recording medium, excluding the formation of the intermediate layers described in detail below, do not limit the principles according to this embodiment in any way.

(Method of Producing Intermediate Layer)

The method for producing the intermediate layers is now mainly described in the context of the method for manufacturing the multi-layered information recording medium.

Figure 3:
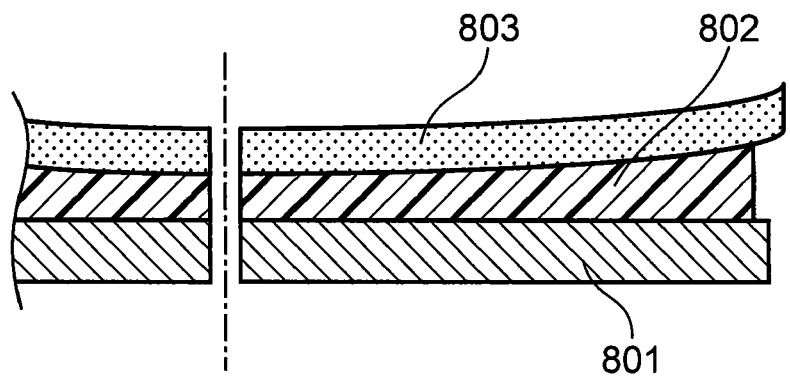
FIG. 3 is a schematic cross sectional view for explaining a thickness distribution of the intermediate layer caused by a difference in tilt between a substrate and a transfer stamper.

FIG. 3 is a schematic cross sectional view of a substrate and a transfer stamper affixed to the substrate. Drawbacks about the process for affixing the transfer stamper to the substrate, which is described with reference to FIG. 3, are now described with reference to FIGS. 2A to 3.

As shown in FIG. 3, radiation curable resin 802 is applied on a substrate 801. A transfer stamper 803 is affixed in the vacuum chamber 707 as described with reference to FIGS. 2A to 2D. FIG. 3 depicts the schematic cross sectional view of the substrate 801, the radiation curable resin 802 and the transfer stamper 803, which are removed from the vacuum chamber 707.

In order to make the description clearer, FIG. 3 shows the substrate 801 with substantially no warp (the warp (tilt) of the substrate 801 is substantially 0 degrees), and the warping transfer stamper 803. The outer circumference of the transfer stamper 803 shown in FIG. 3 warps and is more distant from the substrate 801.

The pressure plate 706 described with reference to FIGS. 2A to 2D pressurizes the transfer stamper 803 affixed to the substrate 801 with interposing the radiation curable resin 802 in the vacuum chamber 707. As a result, the transfer stamper 803 becomes parallel to the substrate 801 to a certain degree in the vacuum chamber 707. However, when the pressurization of the pressure plate 706 is removed, restitution force resulting from the rigidity of the substrate 801 and the transfer stamper 803 works on the substrate 801 and the transfer stamper 803.

As shown in FIG. 3, if there is any difference in warp between the substrate 801 and the transfer stamper 803, the layer of the radiation curable resin 802 between the substrate 801 and the transfer stamper 803 varies in thickness due to the restitution force which works on the substrate 801 and the transfer stamper 803. The transfer stamper 803 warps so that the transfer stamper 803 becomes more distant from the substrate 801 toward the outer circumference of the transfer stamper 803. Accordingly, the layer of the radiation curable resin 802 becomes thicker toward the outer circumference of the transfer stamper 803.

FIG. 3 shows influence on the thickness of the radiation curable resin 802 caused by the difference in the tilt (radial tilt) in the radial direction. The influence on the thickness of the radiation curable resin 802 described with reference to FIG. 3 similarly appears when there is a difference in tilt (tangential tilt) in the circumferential direction between the substrate 801 and the transfer stamper 803.

As shown in FIG. 3, variation depending on a relationship of the tilt between the substrate 801 and the transfer stamper 803 occurs in thickness distribution of the intermediate layer (layer of the radiation curable resin 802), which is formed by affixing the transfer stamper 803 to the substrate 801.

The three-layered Blu-ray disc 600 described with reference to FIG. 1 comprises the first intermediate layers 604, and the second intermediate layer 607 laminated on the first intermediate layer 604. The thicknesses from the surface of the protective layer 610 to the first, second and third information layer 603, 606, 609 deeply depends on how the thickness distributions between the first and second intermediate layers 604, 607 overlaps. Ideally, in the process of affixing the transfer stamper 803 to the substrate 801, the affixing surfaces of the substrate 801 and the transfer stamper 803 are preferably as parallel as possible during affixing the transfer stamper 803 to the substrate 801.

However, the shape characteristics of the substrate 801 and/or the transfer stamper 803, which are molded with injection molding, depend on a molding machine configured to manufacture these components. Accordingly, the tilt of the substrate 801 and/or the transfer stamper 803 occurs under some conditions defined by the molding machine (for example, structure of cooling water passages in a mold) and some molding conditions (temperature setting and molding tact of the mold). Consequently, it is extremely difficult to control shapes of the substrate 801 and the transfer stamper 803 so that the affixing surfaces thereof become parallel. Meanwhile, if the substrate 801 and/or transfer stamper 803 is manufactured using the same molding machine under the same molding condition, they have specific tilt patterns, which is dependent on the molding machine and the molding conditions.

As described above, the tilt pattern of the substrate 801 and/or transfer stamper 803 includes the radial tilt which means warp in the radial direction from the inner circumference to the outer circumference thereof, and the tangential tilt which means warp in the circumferential direction thereof. The radial tilt may be controlled to a certain degree by adjusting mold temperature of a molding machine. Accordingly, the mold temperature of the molding machine to manufacture the transfer stamper 803 may be adjusted to match the radial tilt of the substrate 801 to which the transfer stamper 803 is affixed. By adjusting the mold temperature of the molding machine to manufacture the transfer stamper 803, the radial tilt of the transfer stamper 803 is controlled so that the affixing surfaces of the substrate 801 and the transfer stamper 803 become substantially parallel. Consequently, variation in thickness of the intermediate layer caused by the radial tilt may be decreased by adjusting the mold temperature of the molding machine.

However, it is less likely to control the tangential tilt only with the adjustment of the mold temperature. Accordingly, it is not practical to control a shape of the transfer stamper 803 to match a shape of the substrate 801. In addition, the transfer stamper 803 is thinner than the substrate 801 in order to facilitate the peel-off from the intermediate layer (for example, while the substrate 801 is 1.1 mm in thickness, the transfer stamper 803 is set to 0.6 mm in thickness). It is more likely that the tangential tilt occurs in the thinner transfer stamper 803. Consequently, it is less likely to mold the transfer stamper 803 under a shape control to make it parallel with the substrate 801.

Accordingly, the warp of the transfer stamper 803 has a specific tangential tilt pattern (specific tangential tilt pattern defined by conditions depending on a structure of a molding machine or molding parameters of the transfer stamper 803), on which the radial tilt controlled by the adjustment of the mold temperature may be superposed as well.

Figure 4A:
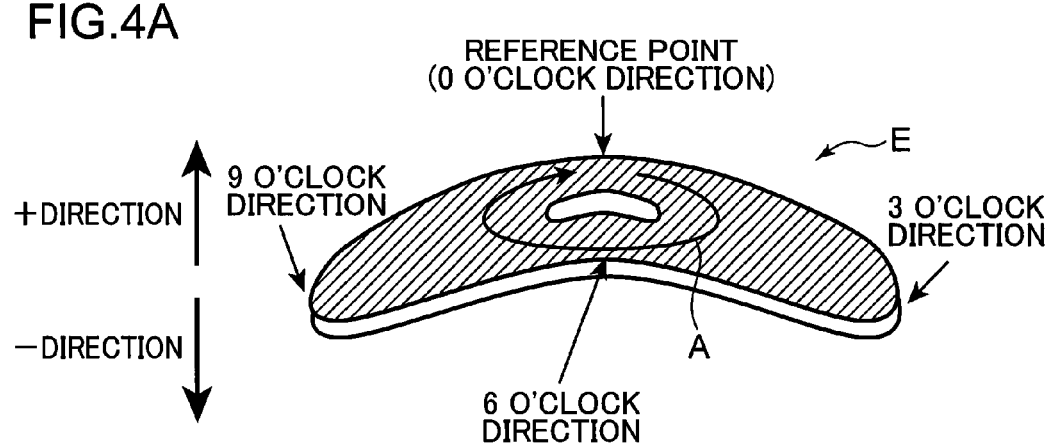
FIGS. 4A and 4B are schematic views for explaining tangential tilt of the transfer stamper.
Figure 4B:
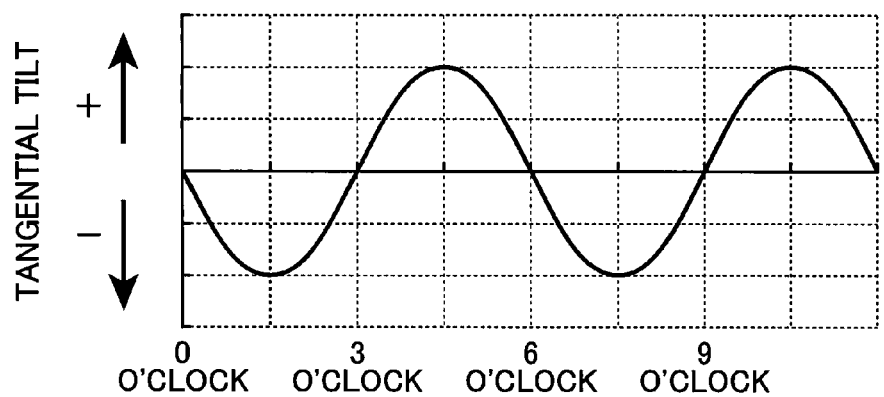

FIGS. 4A and 4B depict a tangential tilt pattern. FIG. 4A is a schematic perspective view of a circular disk warped according to the tangential tilt pattern. FIG. 4B is a graph representing the tangential tilt of the circular disc shown in FIG. 4A. The tangential tilt pattern is now described with reference to FIGS. 4A and 4B.

The circular disc E in FIG. 4A is provided with a reference point. The position of the reference point in the circular disc E is defined as the "0 o'clock direction". A position angularly displaced by 90° from the reference point of the circular disc E is defined as "3 o'clock direction". A position angularly displaced by 180° from the reference point of the circular disc E is defined as the "6 o'clock direction". The position angularly displaced by 270° from the reference point of the circular disc E is defined as the "9 o'clock direction".

An arrow A turning in the clockwise direction is shown on the circular disc E in FIG. 4A. If the upper surface of the circular disc E is tilted downward along the advancing direction of the arrow A, the tangential tilt of the circular disc E is defined as "tangential tilt in the negative direction". If the upper surface of the circular disc E is tilted upward along the advancing direction of the arrow A, the tangential tilt of the circular disc E is defined as "tangential tilt in the positive direction". It should be noted that like the transfer stamper used for producing the three-layered Blu-ray disc 600 described with reference to FIG. 1, the circular disc E is 60 mm in radius.

FIG. 4B is a graph of the tangential tilt of the circular disc E, which is depicted according to the foregoing definitions. The graph of FIG. 4B shows variation in the tilt of the circular disc E which is measured along the outer edge of the circular disc E.

The upper surface of the circular disc E is tilted downward between "0 o'clock direction" and "3 o'clock direction". Accordingly, the graph in FIG. 4B shows "tangential tilt in the negative direction" between "0 o'clock direction" and "3 o'clock direction". In "3 o'clock direction" of the circular disc E, the tilt of the upper surface of the circular disc E changes from "downward" to "upward" along the advancing direction of the arrow A. Accordingly, the graph in FIG. 4B shows a value of "0" in "3 o'clock direction".

The upper surface of the circular disc E is tilted upward between "3 o'clock direction" and "6 o'clock direction". Accordingly, the graph in FIG. 4B shows "tangential tilt in the positive direction" between "3 o'clock direction" and "6 o'clock direction". In "6 o'clock direction" of the circular disc E, the tilt of the upper surface of the circular disc E changes from "upward" to "downward" along the advancing direction of the arrow A. Accordingly, the graph shown in FIG. 4B shows a value of "0" in "6 o'clock direction".

The circular disc E between "6 o'clock direction" and "9 o'clock direction" has the same tangential tilt as the tangential tilt of the circular disc E between "0 o'clock direction" and "3 o'clock direction". The circular disc E between "9 o'clock direction" and "0 o'clock direction" has the same tangential tilt as the tangential tilt of the circular disc E between "3 o'clock direction" and "6 o'clock direction".

The graph of FIG. 4B depicts a substantial sine curve with two ridges and two valleys. The principles according to this embodiment may also be applied to transfer stampers with any tangential tilt pattern, which is represented with a different curvature in shape. Accordingly, the tangential tilt pattern to which the principles according to this embodiment may be applied does not have to be "0 degrees" in "0 o'clock direction," "3 o'clock direction," "6 o'clock direction" and/or "9 o'clock direction". Depending on a molding machine to manufacture the transfer stamper or molding conditions applied to the molding machine, positions of ridges and valleys of a curve representing the tangential tilt pattern may shift. However, if the transfer stamper is manufactured by the same molding machine under the same molding condition, the positions of the ridge and the valley of the tangential tilt pattern with respect to the reference point may be substantially constant. When a start position of the character information recorded on the transfer stamper molded using the same molding machine under the same molding condition is defined as "0 o'clock direction", the tangential tilt in "0 o'clock direction", "3 o'clock direction" (angularly displaced position by 90 degrees from "0 o'clock direction"), "6 o'clock direction" (angularly displaced position by 180 degrees from the "0 o'clock direction"), and the "9 o'clock direction" (angularly displaced position by 270 degrees from the "0 o'clock direction") and may be substantially constant among the transfer stampers.

As described with reference to FIG. 3, the substrate 801 (1.1 mm in thickness) is thicker than the transfer stamper 803. Accordingly, the variation in tangential tilt of the substrate 801 is smaller than the variation in tangential tilt of the transfer stamper 803. Thickness distribution of the intermediate layer formed from the radiation curable resin 802 between the substrate 801 and the transfer stamper 803 which is affixed to the substrate 801 corresponds to the difference in tangential tilt between the substrate 801 and the transfer stamper 803.

The three-layered Blu-ray disc 600 described with reference to FIG. 1 comprises the first and second intermediate layers 604, 607 and the protective layer 610, which are all laminated on the substrate 601. The thickness distribution caused by the difference in tangential tilt between the substrate 601 and the transfer stamper 704 appears in the first and second intermediate layers 604, 607. If a thicker portion of the first intermediate layer 604 overlaps with a thicker portion of the second intermediate layer 607, and a thinner portion of the first intermediate layer 604 overlaps with a thinner portion of the second intermediate layer 607, an even more emphasized thickness distribution appears in the intermediate layer including the first and second intermediate layers 604, 607. As a result, the thicknesses from the surface of the protective layer 610 of the three-layered Blu-ray disc 600 to the first and second information layers 603, 606 vary considerably. In particular, the variation in thickness from the surface of the protective layer 610 to the most distant first information layer 603 much increases.

In this embodiment, an orientation of the transfer stamper 704 is controlled when the transfer stamper 704 is affixed to the substrate 601 so that the thicker portion of the first intermediate layer 604 does not overlap with the thicker portion of the second intermediate layer 607, and so that the thinner portion of the first intermediate layer 604 does not overlap with the thinner portion of the second intermediate layer 607.

Figure 5:
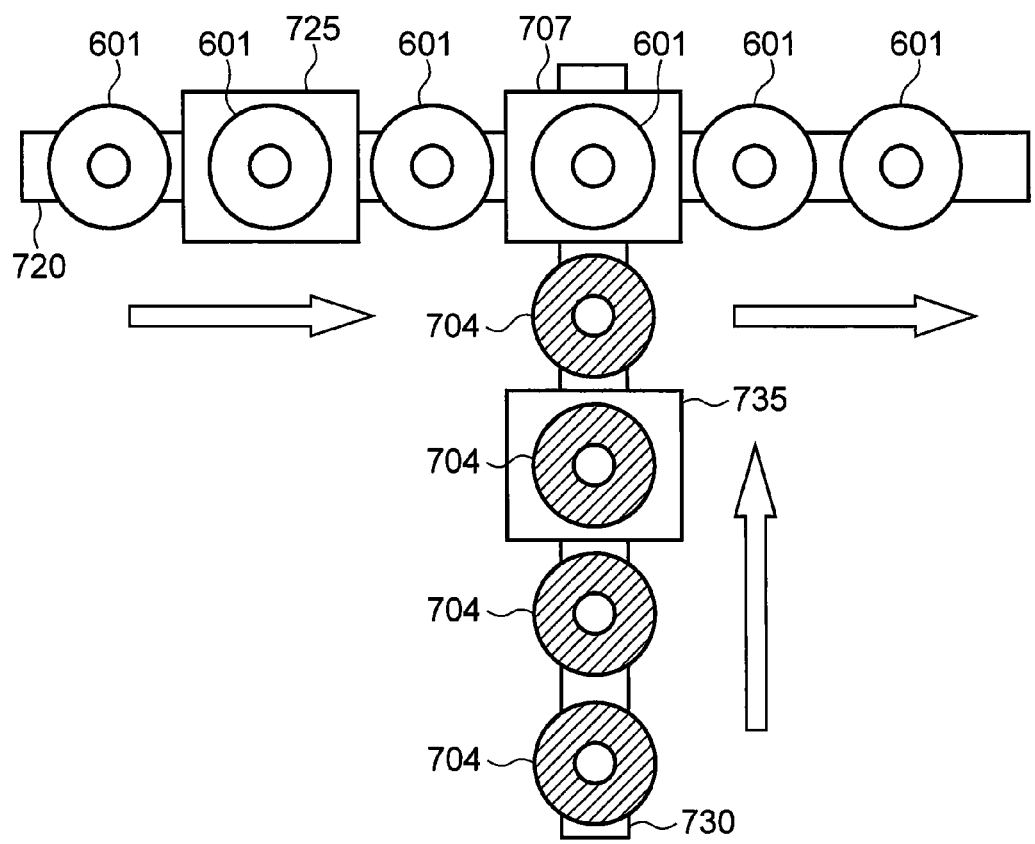
FIG. 5 schematically shows an affixing process of the transfer stamper to the substrate.

FIG. 5 schematically shows the process of affixing the transfer stamper 704 to the substrate 601. The process of affixing the transfer stamper 704 to the substrate 601 is now described with reference to FIGS. 1 to 2D and FIG. 5.

As described above, the substrate 601 is subjected to an injection molding using a molding machine (not shown). The molding machine records character information at the inner circumferential part of the substrate 601. Accordingly, the start position of the character information formed on the substrate 601 is defined by the molding machine. In this embodiment, the molding machine configured to mold the substrate 601 is exemplified as a substrate manufacturing device. In addition, the character information is exemplified as the first reference position information.

Before the substrate 601 is affixed to the transfer stamper 704, the substrate 601 is placed in a deposition system (not shown), to form the first information layer 603. FIG. 5 shows the substrate 601 after the first information layer 603 is formed thereon.

FIG. 5 shows, in addition to the vacuum chamber 707 described with reference to FIGS. 2A to 2D, a first conveyor 720 configured to convey the substrate 601 toward the vacuum chamber 707, and an orientation adjuster 725 for the substrate 601, which adjusts an orientation of the substrate 601 moving toward the vacuum chamber 707. As described above, after the first information layer 603 is formed, the substrate 601 is conveyed to the vacuum chamber 707 by the first conveyor 720. As described above, the first information layer 603 is deposited using a sputtering device. The radiation curable resin 704 is also applied on the first information layer 603 by a spin coating method or the like. Accordingly, the substrate 601 is rotated during formation of the first information layer 603 and during coat of the radiation curable resin 704. As a result, the orientation of the substrate 601 (direction from the center point of the substrate 601 toward the start position of the character information recorded on the substrate 601) is inconsistent before passage through the orientation adjuster 725.

Figure 6:
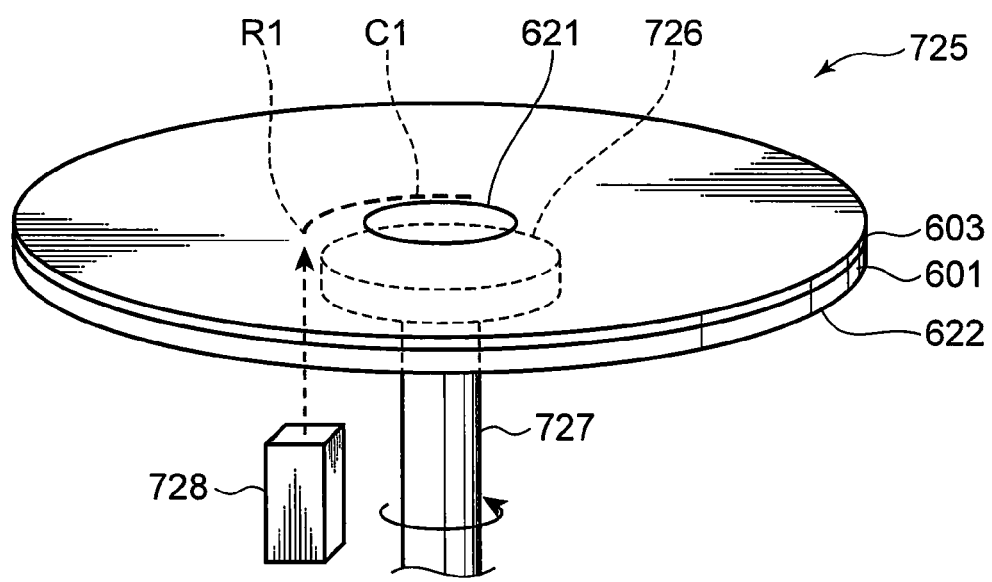
FIG. 6 is a schematic perspective view of an orientation adjuster configured to adjust an orientation of the substrate.

FIG. 6 schematically shows the orientation adjuster 725 for the substrate 601. The orientation adjustment of the substrate 601 is now described with reference to FIGS. 1 to 2D and FIGS. 5 and 6.

The orientation adjuster 725 comprises a support member 726 configured to support the substrate 601 conveyed by the first conveyor 720, and a rotation shaft 727 configured to rotate the support member 726. As shown in FIG. 6, the character information C1 is recorded at the inner circumferential part near the inner edge 621 of the substrate 601. A leading end of the character information C1 in a rotating direction of the rotation shaft 727 becomes a start position R1 of the character information C1. The support member 726 supports a more centered area of the substrate 601 than the character information C1. The rotation shaft 727 rotates substantially concentrically with the substrate 601. In this embodiment, the start position R1 of the character information C1 is exemplified as the first reference point.

The orientation adjuster 725 further comprises an optical microscope 728 disposed below a rotational track of the character information C1. The substrate 601 includes a surface 622 opposite to the surface to which the first information layer 603 is laminated. The optical microscope 728 reads the character information C1 via the surface 622. In this embodiment, the surface 622 is exemplified as the second surface opposite to the first information surface 602.

The first information layer 603 is formed with a reflective film configured to reflect the light entered from the surface 622. Accordingly, the optical microscope 728 may easily read the character information C1 with the reflected light from the reflective film for the light irradiated to the surface 622. The start position R1 of the character information C1 is identified by reading the character information C1. The rotation shaft 727 rotates so that the identified start position R1 of the character information C1 moves to a predetermined position. As a result, the position of the character information C1 of the substrate 601 discharged from the orientation adjuster 725 may be substantially consistent. The transfer stamper 704 in the vacuum chamber 707 is affixed to the substrate 601 after the positional adjustment for the position of the character information C1 to be consistent. In this embodiment, the vacuum chamber 707 is exemplified as the affixing position.

FIG. 5 shows, in addition to the vacuum chamber 707, the first conveyor 720 and the orientation adjuster 725, a second conveyor 730 configured to convey the transfer stamper 704 for forming the first intermediate layer 604, and an orientation adjuster 735 for the transfer stamper 704.

The transfer stamper 704 is subjected to an injection molding process using a molding machine (not shown). The molding machine records character information on the inner circumferential part of the transfer stamper 704. Accordingly, the start position of the character information formed on the transfer stamper 704 is defined by the molding machine. In this embodiment, the molding machine for molding the transfer stamper 704 is exemplified as a transfer stamper manufacturing device. In addition, the character information recorded on the transfer stamper 704 is exemplified as the second reference position information.

The transfer stamper 704 molded by the molding machine is conveyed to the vacuum chamber 707 by the second conveyor 730. The orientation adjuster 735 adjusts an orientation of the transfer stamper 704 conveyed by the second conveyor 730 (direction from the center point of the transfer stamper 704 toward the start position of the character information recorded on the transfer stamper 704).

Figure 7:
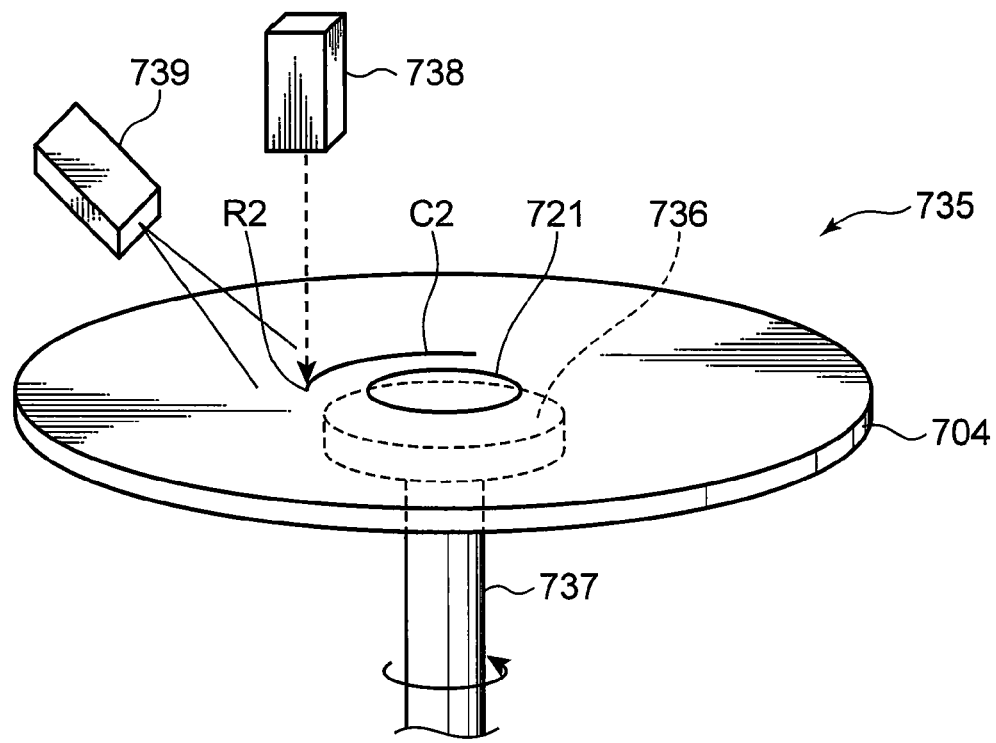
FIG. 7 is a schematic perspective view of an orientation adjuster configured to adjust an orientation of the transfer stamper.

FIG. 7 schematically shows the orientation adjuster 735 for the transfer stamper 704. The orientation adjustment of the transfer stamper 704 is now described with reference to FIGS. 1 to 2D and FIGS. 5 to 7.

The orientation adjuster 735 comprises a support member 736 configured to support the transfer stamper 704 carried by the second conveyor 730, and a rotation shaft 737 configured to rotate the support member 736. As shown in FIG. 7, the character information C2 is recorded on an inner circumferential part near the inner edge 721 of the transfer stamper 704. A leading end of the character information C2 in a rotating direction of the rotation shaft 737 becomes a start position R2 of the character information C2. The support member 736 supports a more centered area of the transfer stamper 704 than the character information C2. The rotation shaft 737 rotates substantially concentrically with the transfer stamper 704. In this embodiment, the start position R2 of the character information C2 is exemplified as the second reference point.

The orientation adjuster 735 further comprises an optical microscope 738. The transfer stamper 704, unlike the substrate 601, does not comprise a reflective film. Accordingly, a light source 739 configured to obliquely irradiate monochromatic light to the surface of the transfer stamper 704 to read the character information C2 and an optical microscope 738 configured to read the character information C2 from directly above the transfer stamper 704 are prepared. Using the monochromatic light irradiated from the light source 739, the optical microscope 738 may more precisely read the character information C2. In this embodiment, the optical microscope 738 uses the monochromatic light obliquely irradiated to the character information represented as a concavo-convex shape on the surface of the transfer stamper 704 to read the character information C2. Alternatively, other methods for reading the character information C2 recorded on the transfer stamper 704 may also be used.

The start position R2 of the character information C2 is identified by reading the character information C2. The rotation shaft 737 rotates so that the identified start position R2 of the character information C2 moves to a predetermined position. As a result, the position of the character information C2 of the transfer stamper 704 discharged from the orientation adjuster 735 may be substantially consistent. The transfer stamper 704 after the positional adjustment for the position of the character information C2 to be consistent is subsequently affixed to the substrate 601 in the vacuum chamber 707.

The transfer stamper 704 is affixed to the substrate 601 according to the process described with reference to FIGS. 2A to 2D. After the transfer stamper 704 is affixed to the substrate 601, the first conveyor 720 discharges the substrate 601 from the vacuum chamber 707. As described with reference to FIGS. 2A to 2D, subsequently, the transfer stamper 704 is peeled from the substrate 601 to form the first intermediate layer 604. After the first intermediate layer 604 is formed, the substrate 601 is placed in a deposition system (not shown), so that the second information layer 606 is formed.

Figure 8:
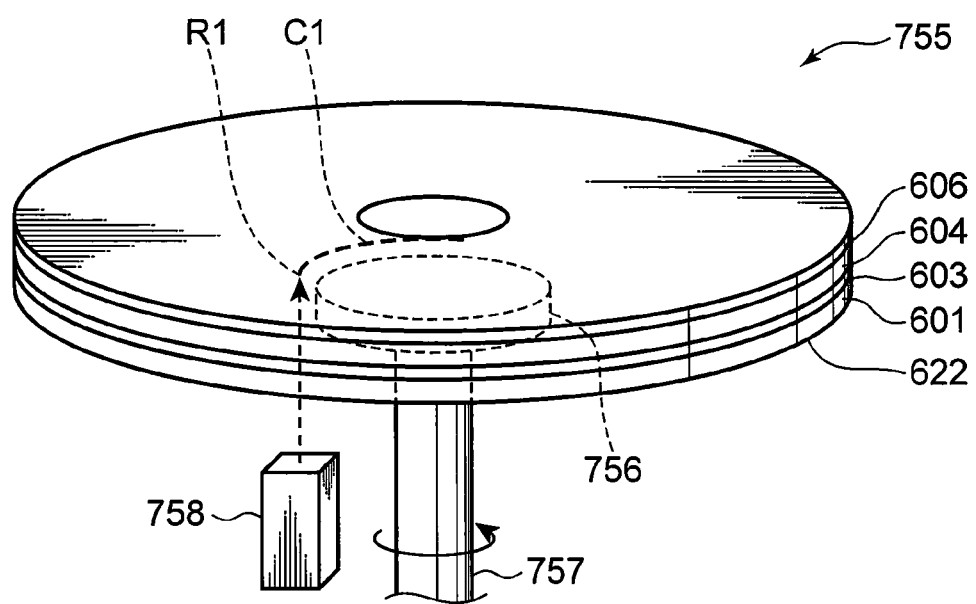
FIG. 8 is a schematic perspective view of an orientation adjuster configured to adjust the orientation of the substrate.

FIG. 8 schematically shows an orientation adjuster 755 configured to adjust an orientation of the substrate 601 after formation of the second information layer 606. The orientation adjustment for the substrate 601 is now described with reference to FIGS. 1 to 2D, FIGS. 5 and 6 and FIG. 8.

After the formation of the second information layer 606 and the coat of the radiation curable resin, the first conveyor 720 carries the substrate 601 to the orientation adjuster 755. The orientation adjuster 755 has substantially the same structure as the orientation adjuster 725 described with reference to FIG. 6.

The orientation adjuster 755 comprises a support member 756 configured to support the substrate 601 conveyed by the first conveyor 720, a rotation shaft 757 configured to rotate the support member 756, and an optical microscope 758 configured to read the character information C1. Like the optical microscope 728 described with reference to FIG. 6, the optical microscope 758 is disposed below the rotational track of the character information C1.

As described above, the first information layer 603 is formed with a reflective film for reflecting the light entered from the surface 622. Accordingly, the optical microscope 758 may easily read the character information C1 with the reflected light from the reflective film for the light irradiated to the surface 622. In particular, since the first information layer 603 has a greater reflectance than the second and third information layers 606, 609, only the character information C1 is observed by the optical microscope 758 reading the character information from the side of the surface 622. Since the character information C1 is read by using the reflected light from the first information layer 603 closer to the optical microscope 758 than the first and second intermediate layers 604, 606, it is less likely that the first and second intermediate layers 604, 606 laminated on the first information layer 603 interfere with reading the character information C1.

Figure 9B:
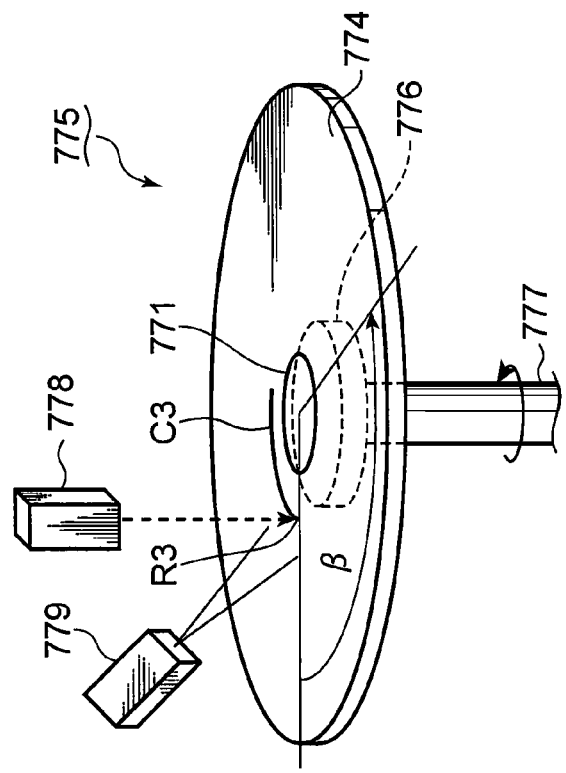
FIGS. 9A and 9B are schematic perspective views of orientation adjusters configured to adjust the orientation of the transfer stamper.
Figure 9A:
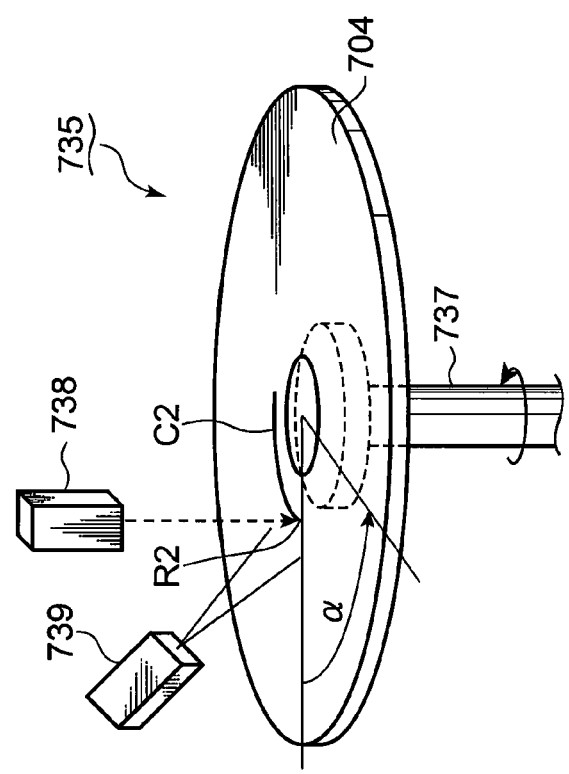

FIGS. 9A and 9B shows differences between the orientation adjustment of the transfer stamper 704 used for forming the first intermediate layer 604 and the orientation adjustment of the transfer stamper used for forming the second intermediate layer 607. FIG. 9A shows the orientation adjuster 735 described with reference to FIG. 7. FIG. 9B shows the orientation adjuster configured to adjust an orientation of the transfer stamper used for forming the second intermediate layer 607. The differences between the orientation adjustment of the transfer stamper 704 used for forming the first intermediate layer 604 and the orientation adjustment of the transfer stamper used for forming the second intermediate layer 607 is now described with reference to FIGS. 1 to 2D, FIG. 5, FIG. 7 and FIGS. 9A and 9B.

The transfer stamper 774 used for forming the second intermediate layer 607, as described above, is affixed to the substrate 601 with interposing the radiation curable resin layer applied on the second information layer 606. The orientation adjuster 775 shown in FIG. 9B adjusts the orientation of the transfer stamper 774 (direction from the center point of the transfer stamper 774 toward a start position R3 of the character information C3 recorded on the transfer stamper 774) before the transfer stamper 774 is affixed to the substrate 601.

The orientation adjuster 775 comprises substantially the same structure as the orientation adjuster 735 described with reference to FIG. 7. The orientation adjuster 775 comprises a support member 776 configured to support the transfer stamper 774, a rotation shaft 777 configured to rotate the support member 776, an optical microscope 778 configured to read the character information C3 recorded on an inner circumferential part near the inner edge 771 of the transfer stamper 774, and a light source 779 configured to obliquely irradiating monochromatic light to the surface of the transfer stamper 774 so as to assist the character information C3 formed on the transfer stamper 774 to be read. A leading end of the character information C3 in a rotating direction of the rotation shaft 777 becomes a start position R3 of the character information C3. The support member 776 supports a more centered area of the transfer stamper 774 than the character information C3. The rotation shaft 777 rotates substantially concentrically with the transfer stamper 774. In this embodiment, the start position R3 of the character information C3 is exemplified as the second reference point.

Like the optical microscope 738 of the orientation adjuster 735 described with reference to FIG. 7, the optical microscope 778 uses monochromatic light obliquely irradiated to the character information represented as a concavo-convex shape on the surface of the transfer stamper 774 to read the character information C3.

As shown in FIGS. 9A and 9B, a positional relationship (refer to FIG. 9B) of the optical microscope 778 with respect to the rotation shaft 777 of the orientation adjuster 775 is substantially equal to a positional relationship (refer to FIG. 9A) of the optical microscope 738 with respect to the rotation shaft 737 of the orientation adjuster 735. As shown in FIG. 9A, the rotation shaft 737 of the orientation adjuster 735 rotates by an angle α after identification of the start position R2 of the character information C2 on the transfer stamper 704, and subsequently stops. As shown in FIG. 9B, the rotation shaft 777 of the orientation adjuster 775 rotates by an angle β after identification of the start position R3 of the character information C3 on the transfer stamper 774, and subsequently stops.

Figure 10A:
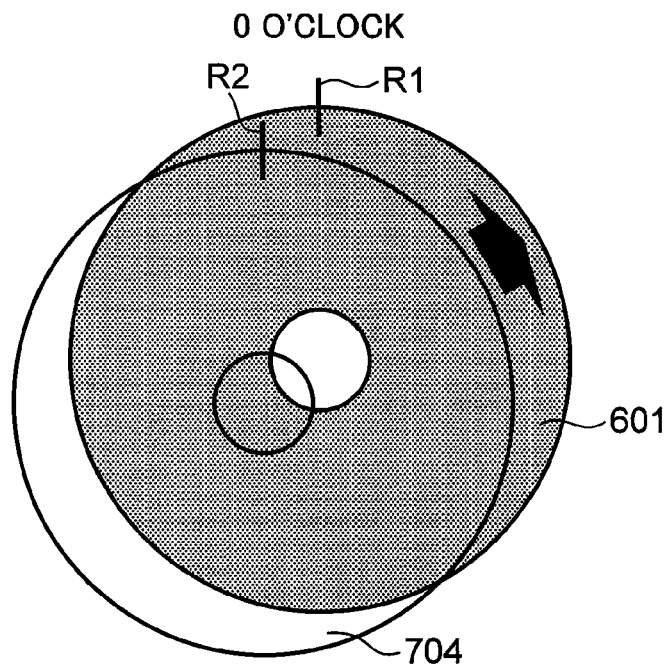
FIGS. 10A and 10B are schematic views for explaining the affixing of the transfer stamper to the substrate.
Figure 10B:
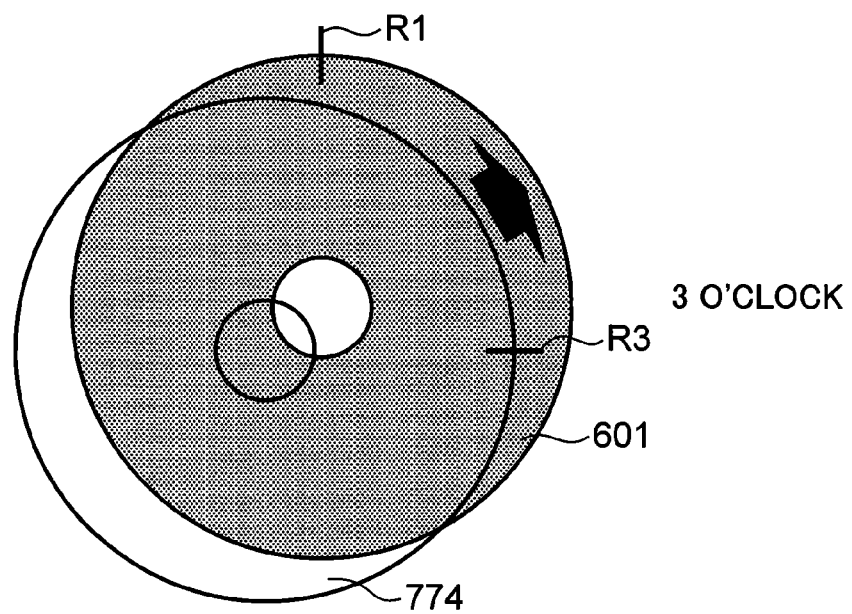

FIGS. 10A and 10B schematically show the process for affixing the transfer stampers 704, 774 to the substrate 601 in the formation process of the intermediate layer. FIG. 10A shows the process for affixing the transfer stamper 704 to the substrate 601 during the formation of the first intermediate layer 604. FIG. 10B shows the process for affixing the transfer stamper 774 to the substrate 601 during the formation of the second intermediate layer 607. The process for affixing the transfer stampers 704, 774 to the substrate 601 is now described with reference to FIGS. 1 and 6 and FIGS. 8 to 10.

Each of the orientation adjusters 725, 755 described with reference to FIGS. 6 and 8 adjusts the orientation of the substrate 601 so that the start position R1 of the character information C1 is disposed at "0 o'clock direction". The start position R2 of the character information C2 recorded on the transfer stamper 704 shown in FIG. 9A is detected and then rotated by the angle α, so that the start position R2 of the character information C2 is disposed at "0 o'clock direction". Accordingly, the start position R2 of the character information C2 on the transfer stamper 704 overlaps with the start position R1 of the character information C1 on the substrate 601.

In this embodiment, the rotating angle β of the rotation shaft 777 of the orientation adjuster 775 described with reference to FIGS. 9A and 9B is greater than the rotating angle α of the rotation shaft 737 of the orientation adjuster 735 by 90 degrees. Accordingly, when the transfer stamper 774 is affixed to the substrate 601, the start position R3 of the character information C3 on the transfer stamper 774 is at the angularly displaced position by 90 degrees (3 o'clock direction) with respect to the start position R1 of the character information C1 of the substrate 601. As a result, it is preferably less likely that a thicker portion of the first intermediate layer 604 overlaps with a thicker portion of the second intermediate layer 607. Similarly, it is preferably less likely that a thinner portion of the first intermediate layer 604 overlaps with a thinner portion of the second intermediate layer 607. Consequently, it is less likely that the variation in thickness from the surface of the protective layer 610 to the first information layer 603 increases.

As described above, in the three-layered Blu-ray disc 600 including three information layers (the first, second and third information layers 603, 606, 609), the orientation of the start position R2 of the character information C2 of the first intermediate layer 604 with respect to the start position R1 of the character information C1 recorded on the substrate 601 is different from the orientation of the start position R3 of the character information C3 of the second intermediate layer 607 with respect to the start position R1 of the character information C1 recorded on the substrate 601. In the manufacture of the multi-layered information recording medium with N information layers, the transfer stamper is set to a different orientation for each formation of the intermediate layer by the orientation adjustment process of the transfer stamper for forming the intermediate layer.

Table 1 below shows effect of the orientation of the transfer stamper affixed to the substrate 601 to form the second intermediate layer 607. As shown in FIGS. 10A and 10B, the orientation of the transfer stamper 704 affixed to the substrate 601 to form the first intermediate layer 604 was set so that the start position R2 of the character information C2 on the transfer stamper 704 overlapped with the start position R1 of the character information C1 on the substrate 601. In the ensuing description, the transfer stamper 704 used for the formation of the first intermediate layer 604 is referred to as the first transfer stamper 704. The transfer stamper 774 used for the formation of the second intermediate layer 607 is referred to as the second transfer stamper 774.

The first intermediate layer 604 in the three-layered Blu-ray disc 600 was set to approximately 25 μm in thickness. The second intermediate layer 607 in the three-layered Blu-ray disc 600 was set to approximately 18 μm in thickness. The protective layer 610 in the three-layered Blu-ray disc 600 was set to approximately 57 μm in thickness.

An average value of the thickness dimensions from the surface of the protective layer 610 to the first information layer 603 within a radius range from 23 mm to 24 mm was defined as the "thickness reference". The thickness from the surface of the protective layer 610 to the first information layer 603 was measured within a radius range from 24 mm to 58.2 mm which corresponds to the outer circumferential edge of the three-layered Blu-ray disc 600. The most deviated value among the measured thickness dimensions from the thickness reference was recorded as "thickness variation" shown in Table 1.

Figure 11:
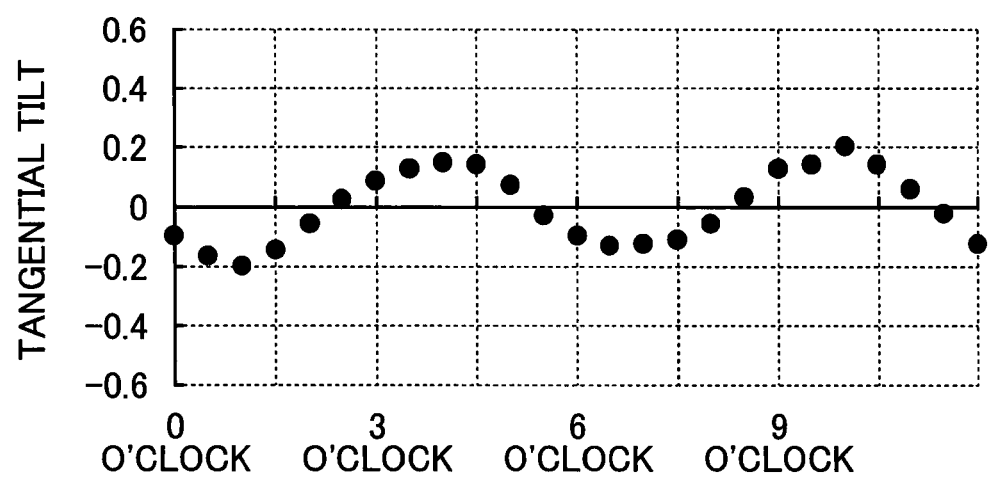
FIG. 11 is a graph for explaining the tangential tilt of the transfer stamper.

FIG. 11 shows the distribution of the tangential tilt of the transfer stampers (the first and second transfer stampers 704, 774) used in the production of the intermediate layers (the first and second intermediate layers 604, 607). The distribution of the tangential tilt shown in FIG. 11 was depicted on the basis of measurement values of the tangential tilt at the position of a radius of 58 mm.

The start positions R1, R2 of the character information C1, C2 of the transfer stampers (the first and second transfer stampers 704, 774) were used as the reference point for measuring the tangential tilt. The start positions R1, R2 of the character information C1, C2 of the transfer stampers (the first and second transfer stampers 704, 774) are shown as "0 o'clock direction" in the graph shown in FIG. 11.

As shown in FIG. 11, the distribution of the tangential tilt shows two ridges and two valleys through one revolution measurement. The transfer stampers (the first and second transfer stampers 704, 774) having distributions of the tangential tilt in a range of "−0.18 degrees" to "0.19 degrees" were used for sampling the data shown in Table 1. It should be noted that the radial tilts of the transfer stampers (the first and second transfer stampers 704, 774) used for sampling the data shown in Table 1 was adjusted so that the transfer stampers (the first and second transfer stampers 704, 774) become parallel to the substrate 601 as much as possible.

In the case of a three-layered structure medium with a 100 GB capacity such as a three-layered Blu-ray disc 600, the storage capacity per information layer is larger than a two-layered structure medium. Accordingly, the spherical aberration resulting from the variation in thickness considerably affects qualities in the record/reply. It was confirmed in advance that the thickness variation which was less likely to cause problems in a record/reply system was 2.5 μm or less from the thickness reference. Accordingly, the thickness variation of 2.5 μm was used as criteria of the determination shown in Table 1. It should be noted that the column of "thickness variation" in Table 1 shows a value range of the thickness variations obtained from ten three-layered Blu-ray discs 600. The column of "orientation of affixed second transfer stamper" in Table 1 shows an angular difference of the orientation of the start position R3 of the character information C3 of the second transfer stamper 774 from the orientation (0 o'clock direction) of the start position R1 of the character information C1 of the substrate 601.

TABLE 1

| Orientation of Affixed Second Transfer Stamper | Thickness Variation (μm) | Determination |
|---|---|---|
| 0 degrees | 2.7 to 3.2 | Inferior |
| 45 degrees | 2.2 to 2.6 | Average |
| 90 degrees | 1.5 to 2.2 | Excellent |
| 180 degrees | 2.6 to 3.3 | Inferior |

As shown with the results of Table 1, when the start position R3 of the character information C3 of the second transfer stamper 774 substantially coincides with the start position R1 of the character information C1 of the substrate 601 ("0 degrees" in the column of "affixing direction of second transfer stamper"), or when the orientation of the start position R3 of the character information C3 of the second transfer stamper 774 is displaced by 180 degrees from the orientation (0 o'clock direction) of the start position R1 of the character information C1 of the substrate 601, a thicker portion of the first intermediate layer 604 overlapped with a thicker portion of the second intermediate layer 607, and a thinner portion of the first intermediate layer 604 overlapped with a thinner portion of the second intermediate layer 607. Accordingly, the thickness variation from the surface of the protective layer 610 to the first information layer 603 increased. As a result, the thickness variation was 2.6 μm or more, in short the target thickness variation of "2.5 μm" was not achieved.

When the orientation of the start position R3 of the character information C3 of the second transfer stamper 774 was displaced by 45 degrees from the orientation (0 o'clock direction) of the start position R1 of the character information C1 of the substrate 601, the thickness variation decreased. However, the measured thickness variation was distributed near the criteria value (2.5 μm) of the determination. Although data from some three-layered Blu-ray discs 600 showed a thickness variation exceeding the criteria value (2.5 μm), it was confirmed a data level substantially achieved the criteria of the determination.

When the orientation of the start position R3 of the character information C3 of the second transfer stamper 774 was displaced by 90 degrees from the orientation (0 o'clock direction) of the start position R1 of the character information C1 of the substrate 601, the thickness variation considerably decreases. All three-layered Blu-ray discs 600 used for the measurement showed thickness variations lower than the determination criteria (2.5 μm).

As described above, when the orientation of the start position R3 of the character information C3 of the second transfer stamper 774 was displaced by 90 degrees from the orientation (0 o'clock direction) of the start position R1 of the character information C1 of the substrate 601, the thickness variation considerably decreased. In this experiment, the start position R3 of the character information C3 of the second transfer stamper 774, which was displaced by 90 degrees with respect to the orientation (0 o'clock direction) of the start position R1 of the character information C1 of the substrate 601, was further minutely changed to measure the "thickness variation".

Table 2 shows measurement results of "thickness variation". The column of "thickness variation" in Table 2 shows a value range of thickness variations obtained from ten three-layered Blu-ray discs 600. The column of "orientation of affixed second transfer stamper" in Table 2 shows an angular difference of the orientation of the start position R3 of the character information C3 of the second transfer stamper 774 from the orientation (0 o'clock direction) of the start position R1 of the character information C1 of the substrate 601. Like the experiment described with reference to Table 1, the criteria value for the determination shown in Table 2 was "2.5 μm". The column of "change rate from 90 degrees" in Table 2 shows, in percentage, angular change rates from the displaced position of the second transfer stamper 774 by 90 degrees with respect to the substrate 601.

TABLE 2

| Orientation of Affixed Second Transfer Stamper | Change Rate from 90 Degrees | Thickness Variation (μm) | Determination |
|---|---|---|---|
| 72 degrees | −20% | 1.9 to 2.6 | Average |
| 76.5 degrees | −15% | 2.2 to 2.7 | Average |
| 81 degrees | −10% | 2.0 to 2.4 | Favorable |
| 85.5 degrees | −5% | 1.5 to 2.3 | Excellent |
| 90 degrees | 0% | 1.5 to 2.2 | Excellent |
| 94.5 degrees | 5% | 1.6 to 2.4 | Favorable |
| 99 degrees | 10% | 2.0 to 2.5 | Favorable |
| 103.5 degrees | 15% | 2.3 to 2.6 | Average |
| 108 degrees | 20% | 2.5 to 3.0 | Inferior |

As shown in Table 2, an increase in angle from the displaced position of the second transfer stamper 774 by 90 degrees from the substrate 601 resulted in an increase in thickness variation. When the angular difference between the orientation of the start position R3 of the character information C3 of the second transfer stamper 774 and the orientation (0 o'clock direction) of the start position A1 of the character information C1 of the substrate 601 was "81 degrees" (that is, the change rate was "−10%"), the thickness variation of all three-layered Blu-ray discs 600 used in the experiment fell below 2.5 μm as the determination criteria. However, the angular difference between the orientation of the start position R3 of the character information C3 of the second transfer stamper 774 and the orientation (0 o'clock direction) of the start position R1 of the character information C1 of the substrate 601 fell below "81 degrees", the thickness variation of some three-layered Blu-ray discs 600 exceeded 2.5 μm as the determination criteria.

When the angle difference between the orientation of the start position R3 of the character information C3 of the second transfer stamper 774 and the orientation (0 o'clock direction) of the start position R1 of the character information C1 of the substrate 601 was "99 degrees" (that is, the change rate was "10%"), the thickness variation of all three-layered Blu-ray discs 600 used in the experiment fell below 2.5 μm as the determination criteria. However, when the angular difference between the orientation of the start position R3 of the character information C3 of the second transfer stamper 774 and the orientation (0 o'clock direction) of the start position R1 of the character information C1 of the substrate 601 was over "99 degree", the thickness variation of some three-layered Blu-ray discs 600 exceeded 2.5 μm as the determination criteria.

Accordingly, when the angular difference between the orientation of the start position R3 of the character information C3 of the second transfer stamper 774 and the orientation (0 o'clock direction) of the start position R1 of the character information C1 of the substrate 601 was 90 degrees±10%, less influential thickness variation to the record/reply was obtained.

Similar experiments as those described above were also executed to a four-layered information recording medium comprising four information layers.

The first intermediate layer in the four-layered information recording medium was set to approximately 15.5 µm in thickness. The second intermediate layer in the four-layered information recording medium was set to approximately 19.5 µm in thickness. The third intermediate layer in the four-layered information recording medium was set to approximately 11.5 µm in thickness. The protective layer in the four-layered information recording medium was set to approximately 53.5 µm in thickness.

An average value of thickness dimensions from the surface of the protective layer to the first information layer within a radius range from 23 mm to 24 mm was defined as the "thickness reference". The thickness from the surface of the protective layer to the first information layer was measured within a radius range from 24 mm to 58.2 mm which corresponds to the outer circumferential edge of the four-layered information recording medium. The most deviated value from the thickness reference among the measured thickness dimensions was recorded as "thickness variation" shown in Table 3.

When the first intermediate layer was formed, an orientation of a transfer stamper (hereinafter referred to as "first transfer stamper") was set so that a start position of the character information on the first transfer stamper overlapped with a start position of the character information on the substrate, and then when the second intermediate layer was formed, an orientation of a transfer stamper (hereinafter referred to as "second transfer stamper") was set so that a start position of the character information on the second transfer stamper overlapped with the start position of the character information on the substrate, and finally when the third intermediate layer was formed, an orientation of a transfer stamper (herein after referred to as "third transfer stamper") was set so that a start position of the character information on the third transfer stamper overlapped with the start position of the character information on the substrate.

In the other samples of the four-layered information storage media, the orientation of the affixed second transfer stamper was set so that the start position of the character information on the second transfer stamper was displaced by "30 degrees" from the start position of the character information on the first transfer stamper, and the orientation of the affixed third transfer stamper was set so that the start position of the character information on the third transfer stamper was displaced by "30 degrees" from the start position of the character information on the second transfer stamper.

In addition, in the yet other samples of the four-layered information storage media, the orientation of the affixed second transfer stamper was set so that the start position of the character information on the second transfer stamper was displaced by "60 degrees" from the start position of the character information on the first transfer stamper, and the orientation of the affixed third transfer stamper was set so that the start position of the character information on the third transfer stamper was displaced by "60 degrees" from the start position of the character information on the second transfer stamper.

Furthermore, in the yet other samples of the other four-layered information storage media, the orientation of the affixed second transfer stamper was set so that the start position of the character information on the second transfer stamper was displaced by "90 degrees" from the start position of the character information on the first transfer stamper, and the orientation of the affixed third transfer stamper was set so that the start position of the character information on the third transfer stamper was displaced by "90 degrees" from the start position of the character information on the second transfer stamper.

The first, second and third intermediate layers in the four-layered information recording medium were formed using the first, second and third transfer stampers with the distribution of the tangential tilt described with reference to FIG. 11, respectively. Like the foregoing experiments, a distributional range of the tangential tilt of the first, second and third transfer stampers was "−0.18 degrees" to "0.19 degrees". Like the foregoing experiments, the radial tilts of the first, second and third transfer stampers were adjusted to be parallel with the substrate as much as possible, respectively.

The column of "orientation of affixed second transfer stamper" in Table 3 below shows an angular difference between the orientation of the start position of the character information of the second transfer stamper and the orientation of the start position of the character information of the first transfer stamper. The column of "orientation of affixed third transfer stamper" in Table 3 below shows an angular difference between the orientation of the start position of the character information of the third transfer stamper and the orientation of the start position of the character information of the second transfer stamper.

The thickness variation of 2.5 µm was similarly used as the determination criteria. The column of "thickness variation" in Table 3 shows a value range of the thickness variation obtained from the four-layered information recording media.

TABLE 3

| Orientation of Affixed Second Transfer Stamper | Orientation of Affixed Third Transfer Stamper | Thickness Variation (µm) | Determination |
|---|---|---|---|
| 0 degrees | 0 degrees | 3.6 to 4.8 | Inferior |
| 30 degrees | 30 degrees | 3.3 to 4.2 | Inferior |
| 60 degrees | 60 degrees | 1.9 to 2.4 | Excellent |
| 90 degrees | 90 degrees | 2.4 to 3.0 | Average |

As shown in Table 3, when the start positions of the character information of the first, second and third transfer stampers overlapped with each other, the thickness variation from the protective layer surface to the first information layer became extremely great. Similarly, when the start positions of the character information of the first, second and third transfer stampers were displaced by a 30-degree pitch, the thickness variation from the protective layer surface to the first information layer became extremely great. Under these conditions, the measured thickness variation significantly exceeded the targeted "2.5 µm".

Although the thickness variation decreased when the start positions of the character information of the first, second and third transfer stampers were displaced by a 90-degree pitch, the thickness variation of some four-layered information recording media exceeded the targeted "2.5 µm".

When the start positions of the character information of the first, second and third transfer stampers were displaced by a 60-degree pitch, the thickness variation significantly decreased. The thickness variation of all four-layered information recording media fell below the targeted "2.5 µm". Consequently, the target was achieved when the start positions of the character information of the substrate, the first, second and third transfer stampers were displaced at a 60-degree pitch.

Based on a series of the experiments described above, an optimal deviation angle θ of the character information between the transfer stampers is shown in Equation 1 below.

It should be noted that the variable "N" in the following Equation means a number of information layers.

$$\theta = 180/(N-1) \quad \text{(Equation 1)}$$

According to the foregoing Equation, if the number of information layers is "3", the optimal deviation angle of "90 degrees", which is described in the context of the foregoing experiments, is calculated out. If the number of information layers is "4", the optimal deviation angle of "60 degrees", which is described in the context of the foregoing experiments, is calculated out.

In a four-layered information storage medium, the deviation angle $\theta$ was minutely changed around the "60 degrees" as the optimal deviation angle $\theta$, and the thickness variation was examined by the same experiments as those described above.

Figure 12:
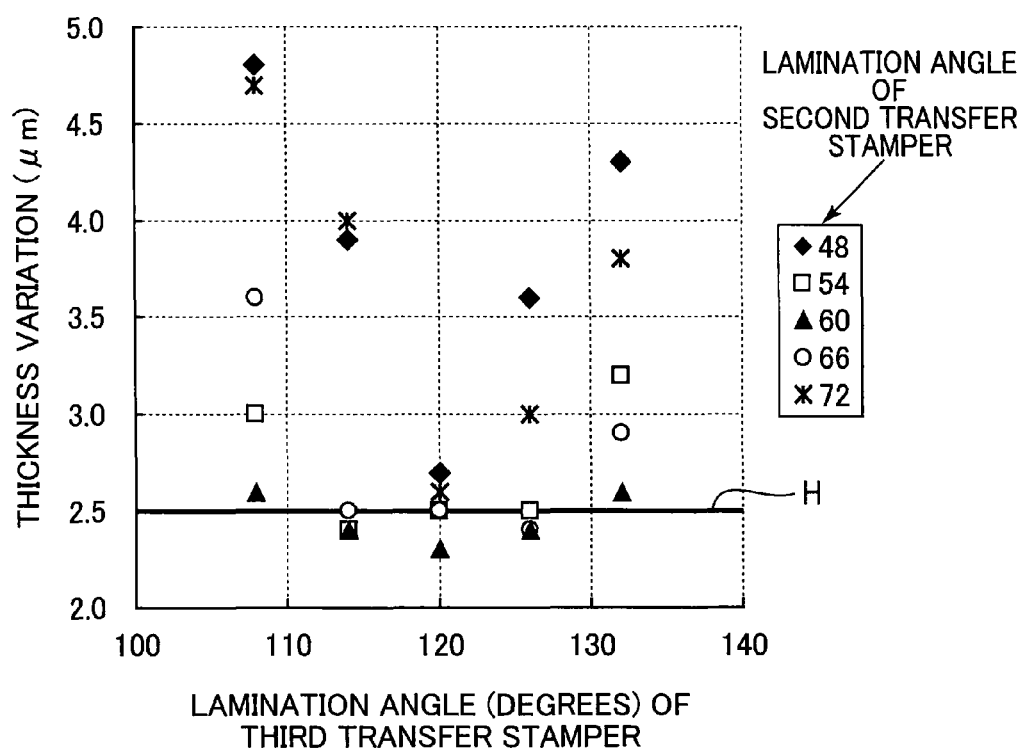
FIG. 12 is a graph showing a distribution of the thickness variation.
Figure 13:
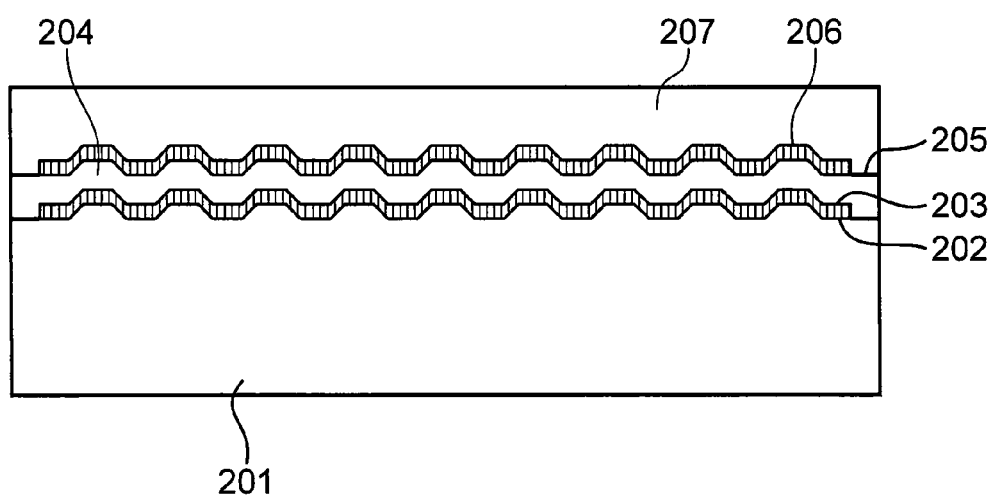
FIG. 13 is a schematic cross sectional view of a dual-layered Blu-ray disc.
Figure 14A:
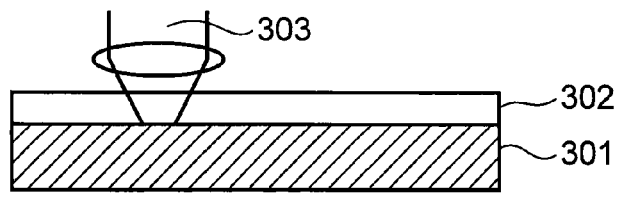
FIGS. 14A to 14F are diagrams for explaining process for producing a stamper.
Figure 14B:
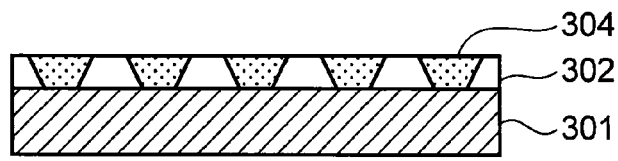
Figure 14C:
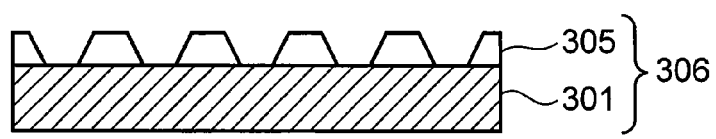
Figure 14D:
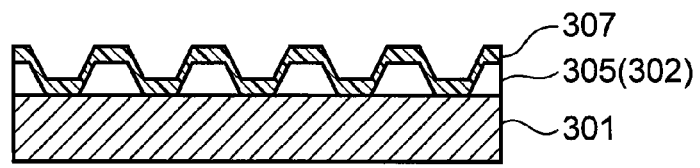
Figure 14E:
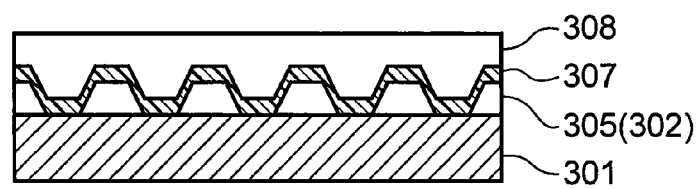
Figure 14F:
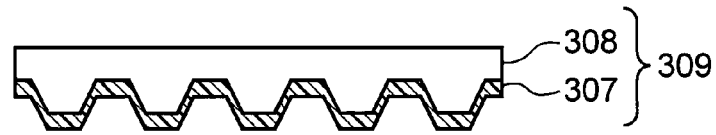
Figure 15A:
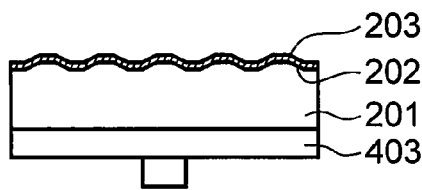
FIGS. 15A to 15I are diagrams for explaining a process for producing a dual-layered Blu-ray disc including a process for producing a resin intermediate layer according to a spin coating method and a process for producing a protective layer.
Figure 15B:
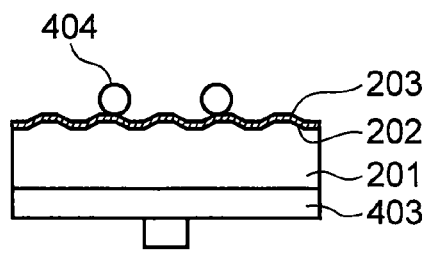
Figure 15C:
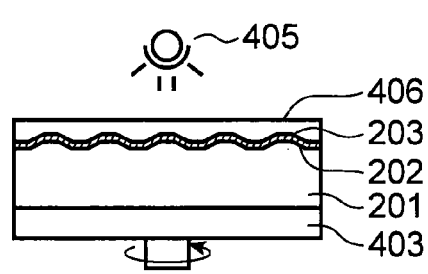
Figure 15D:
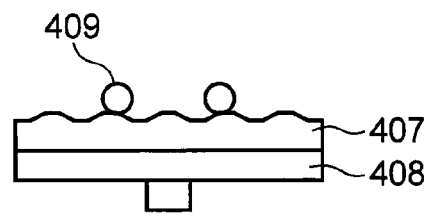
Figure 15E:
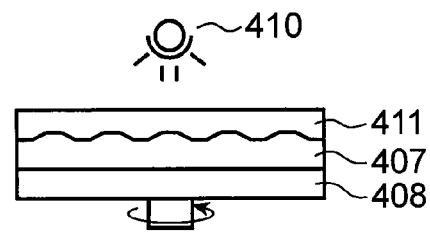
Figure 15F:
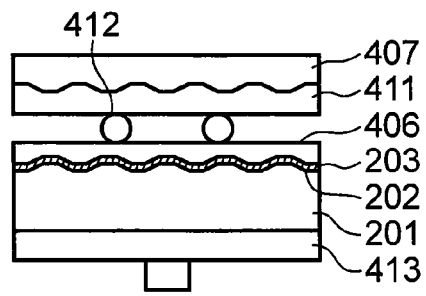
Figure 15G:
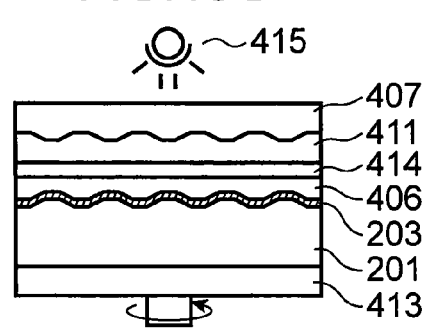
Figure 15H:
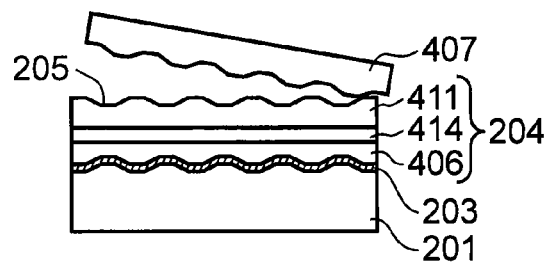
Figure 15I:
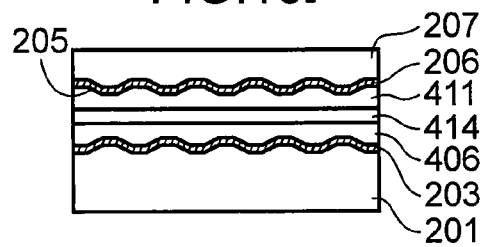
Figure 16:
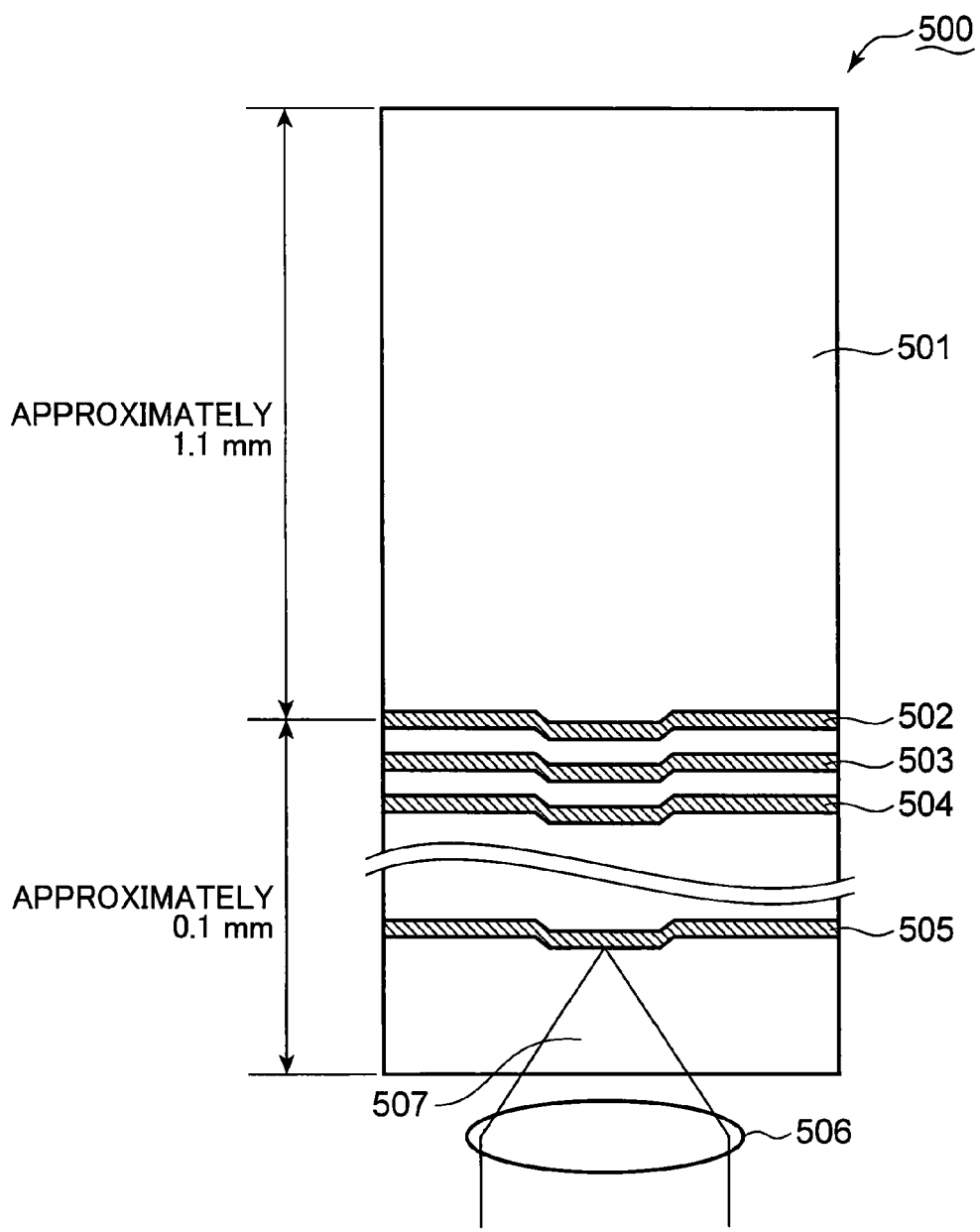
FIG. 16 is a schematic cross sectional view of a multi-layered information recording medium.

FIG. 12 is a graph showing the distribution of the thickness variations. The left vertical axis of FIG. 12 shows the variations in thickness from the surface of the protective layer of the four-layered information storage medium to the first information layer. The horizontal axis of FIG. 12 shows the angular differences between the start position of the character information of the third transfer stamper and the start position of the character information of the substrate. In this experiment, the variations in thickness from the surface of the protective layer to the first information layer were measured when the angular difference between the start position of the character information of the third transfer stamper and the start position of the character information of the substrate was set to 108 degrees, 114 degrees, 120 degrees, 126 degrees, and 132 degrees, respectively. These angles corresponded to angles that were changed by 0%, ±10%, and ±20% from the 60 degrees as the optimal deviation angle $\theta$ of the four-layered information storage medium. The right vertical axis of FIG. 12 shows angles corresponding to the plotted points. In this experiment, variations in thickness from the surface of the protective layer to the first information layer were measured when the angular differences between the start position of the character information of the second transfer stamper and the start position of the character information of the substrate was set to 48 degrees, 54 degrees, 60 degrees, 66 degrees, and 72 degrees, respectively. These angles corresponded to angle that were changed by 0%, ±10%, and ±20% from the 60 degrees as the optimal deviation angle $\theta$ of the four-layered information storage medium. It should be noted that, in this experiment, the start position of the character information of the first transfer stamper was overlapped with the start position of the character information of the substrate.

The plotted points in FIG. 12 represent the worst (greatest thickness variation) data under these conditions, respectively. The horizontal line H in FIG. 12 represents the thickness variation of "2.5 μm" that was used as the determination criteria in the series of experiments described above.

It is figured out from the graph of FIG. 12 that a thickness variation less than the targeted "2.5 μm" may be achieved when the angular difference between the start position of the character information of the second transfer stamper and the start position of the character information of the substrate is 60 degrees±10%, and the angular difference between the start position of the character information of the third transfer stamper and the start position of the character information of the substrate is within the range of ±10% of 60 degrees around 120 degrees.

Based on the series of experiments described above, a preferable thickness variation may be obtained by setting the transfer stamps oriented by the deviation angle calculated from the foregoing Equation 1. In addition, the preferable thickness variation may be maintained within a deviation range of ±10% around the set value as the orientation of the transfer stamper.

As described above, as a result of changing the orientation of the transfer stamper with respect to the substrate according to the number of laminations of the intermediate layer, the thickness variation may decrease. In the case of the three-layered information storage medium, the number of laminations of the intermediate layers is two. Accordingly, the optimal deviation angle $\theta$ that is calculated from the foregoing Equation is "90 degrees". Consequently, a preferable thickness variation may be achieved by changing the orientation of the transfer stamper by 90 degrees each time when an intermediate layer is laminated. In the case of the four-layered information storage medium, the number of laminations of the intermediate layer is three. Accordingly, the optimal deviation angle $\theta$ calculated from the foregoing Equation is "60 degrees". Consequently, a preferable thickness variation may be achieved by changing the orientation of the transfer stamper by 60 degrees each time when an intermediate layer is laminated. The foregoing principles may be suitably applied even to the multi-layered information storage medium comprising more than four information layers. A preferable thickness variation for N-layered information storage medium may be achieved by changing the orientation of the transfer stamper by 180/(N−1) degrees each time when an intermediate layer is laminated.

The foregoing embodiments mainly comprise the following configuration.

A method for manufacturing an information recording medium including N information layers (where N is an integer of 3 or more), (N−1) intermediate layers interposed between the information layers and a protective layer laminated on the Nth information layer which are placed on a substrate formed with a first reference point according to one aspect of the present invention includes a process of forming the information layer on the substrate; a process of repeating, (N−1) times, a process of applying radiation curable resin on the information layer, a process of affixing a transfer stamper formed with a second reference point to the radiation curable resin, a process of curing the radiation curable resin by irradiation, and a process of forming the intermediate layer by peeling the transfer stamper at an interface with the radiation curable resin, in order to sequentially form the (N−1) information layers and the (N−1) intermediate layers and thereafter form the Nth information layer; and a process of forming the protective layer on the Nth information layer, wherein in the process of affixing the transfer stamper to the radiation curable resin, the transfer stamper is affixed so that the second reference point of the transfer stamper is each time at a different position with respect to the first reference point of the substrate.

According to the foregoing configuration, the process of forming the information layer on the substrate formed with the first reference point, the process of applying the radiation curable resin on the information layer, the process of affixing the transfer stamper to the radiation curable resin, the process of curing the radiation curable resin by irradiation, and the process of forming the intermediate layer by peeling the transfer stamper at the interface with the radiation curable resin are repeated (N−1) times. As a result, the (N−1) information layers and the (N−1) intermediate layers are sequentially formed. Subsequently, the Nth information layer is formed. A protective layer is formed on the Nth information layer. In the process of affixing the transfer stamper to the radiation curable resin, the transfer stamper is affixed so that the second reference point of the transfer stamper is positioned differently each time with respect to the first reference point of the substrate. Accordingly, it is less likely that a thickness distribution of the intermediate layer is widened by tilt of the transfer stamper. It is also less likely that worse points in thickness variation of the laminated resin layers are superposed. Consequently, the thickness variation from the surface of the protective layer to the respective information layers decreases, so that it is less likely that qualities in record/reply deteriorate. As a result, a multi-layered medium with a greater recording capacity per layer becomes more precise so that the qualities in the record and the reply are less likely to deteriorate.

In the foregoing configuration, preferably, there are tilt patterns of (N−1) transfer stampers where relative tilt directions of 3 o'clock, 6 o'clock, and 9 o'clock when the second reference point of the transfer stamper is defined as 0 o'clock direction are substantially the same tilt directions, respectively.

According to the foregoing configuration, there are tilt patterns of (N−1) transfer stampers where relative tilt directions of 3 o'clock, 6 o'clock, and 9 o'clock when the second reference point of the transfer stamper is defined as 0 o'clock direction are substantially the same tilt directions, respectively. In the process of affixing the transfer stamper to the radiation curable resin, as a result of the transfer stamper being affixed so that the second reference point of the transfer stamper is positioned differently each time with respect to the first reference point of the substrate, it is less likely that the thickness distribution of the intermediate layer is widened by the tilt of the transfer stamper. It is also less likely that worse points in thickness variation of the laminated resin layers are superposed. Consequently, the thickness variation from the surface of the protective layer to the respective information layers decreases, so that it is less likely that the qualities in record/reply deteriorate.

In the foregoing configuration, preferably, the tilt pattern of the transfer stamper is represented with a variation pattern of a tangential tilt with respect to the second reference point of the transfer stamper.

According to the foregoing configuration, even if the tilt pattern of the transfer stamper varies according to the tangential tilt of the variation pattern, in the process of affixing the transfer stamper to the radiation curable resin, as a result of the transfer stamper being affixed so that the second reference point of the transfer stamper is positioned differently each time with respect to the first reference point of the substrate, it is less likely that the thickness distribution of the intermediate layer is widened by the tilt of the transfer stamper. It is also less likely that worse points in thickness variation of the laminated resin layers are superposed. Consequently, the thickness variation from the surface of the protective layer to the respective information layers decreases, so that it is less likely that the qualities in record/reply deteriorate.

In the foregoing configuration, preferably, the second reference point of the transfer stamper is formed by a transfer stamper manufacturing device configured to manufacture the transfer stamper.

According to the foregoing configuration, the second reference point of the transfer stamper is formed with the transfer stamper manufacturing device configured to manufacture the transfer stamper. Accordingly, the second reference point of the transfer stamper is provided to a substantially constant position with respect to the tilt pattern of the transfer stamper which is defined by the transfer stamper manufacturing device. As a result, in the process of affixing the transfer stamper to the radiation curable resin, when the transfer stamper is affixed so that the second reference point of the transfer stamper is positioned differently each time with respect to the first reference point of the substrate, it is less likely that the thickness distribution of the intermediate layer is widened by the tilt of the transfer stamper. It is also less likely that worse points in thickness variation of the laminated resin layers are superposed. Consequently, the thickness variation from the surface of the protective layer to the respective information layers decreases, so that it is less likely that the qualities in record/reply deteriorate.

In the foregoing configuration, preferably, the first reference point of the substrate is formed by the substrate manufacturing device configured to manufacture the substrate, and wherein the process of affixing the transfer stamper to the radiation curable resin includes: a process of reading the first reference point of the substrate; and a process of rotating the substrate so as to adjust the first reference point of the substrate to a predetermined position at a position for affixing the transfer stamper to the substrate.

According to the foregoing configuration, the first reference point of the substrate is formed with the substrate manufacturing device configured to manufacture the substrate. The processing of affixing the transfer stamper to the radiation curable resin includes a process of reading the first reference point of the substrate, and a process of rotating the substrate so as to adjust the first reference point of the substrate to a predetermined position at an affixing position of the substrate to the transfer stamper. Since the first reference point of the substrate becomes substantially constant at the affixing position of the transfer stamper to the substrate, the quality of the manufactured information recording medium is stabilized.

In the foregoing configuration, preferably, the substrate includes a first surface to which the information layer is laminated and a second surface opposite to the first surface, and the process of reading the first reference point of the substrate includes a process of irradiating from a side of the second surface and reading reflected light from the first surface through the substrate.

According to the foregoing configuration, the substrate includes a first surface to which the information layer is laminated and a second surface opposite to the first surface. In the process of reading the first reference point of the substrate, light is irradiated from the second surface side. The first reference point is appropriately read using the reflected light from the first surface through the substrate.

In the foregoing configuration, preferably, the process of affixing the transfer stamper to radiation curable resin includes: a process of reading the second reference point of the transfer stamper; and a process of rotating the transfer stamper so that the second reference point of the transfer stamper is each time at a different position with respect to the first reference point of the substrate at a position of affixing the transfer stamper to the substrate.

According to the foregoing configuration, in the process of affixing the transfer stamper to the radiation curable resin, the second reference point of the transfer stamper is read. Subsequently, in the affixing position of the transfer stamper to the substrate, the transfer stamper is rotated so that the second reference point of the transfer stamper is oriented differently each time with respect to the first reference point of the substrate. As a result, it is less likely that the thickness distribution of the intermediate layer is widened by the tilt of the transfer stamper. It is also less likely that worse points in thickness variation of the laminated resin layers are superposed. Consequently, the thickness variation from the surface of the protective layer to the respective information layers decreases, so that it is less likely that the qualities in record/reply deteriorate.

In the foregoing configuration, preferably, in the process of affixing the transfer stamper to the radiation curable resin, the transfer stamper is affixed to the substrate so that the second reference point of the transfer stamper is each time displaced within a range of $180/(N-1)\pm 10\%$ with respect to the first reference point of the substrate.

According to the foregoing configuration, the transfer stamper is affixed to the substrate so that the second reference point of the transfer stamper is each time displaced within a range of $180/(N-1)\pm 10\%$ with respect to the first reference point of the substrate. Accordingly, it is less likely that the thickness distribution of the intermediate layer is widened by the tilt of the transfer stamper. It is also less likely that worse points in thickness variation of the laminated resin layers are superposed. Consequently, the thickness variation from the surface of the protective layer to the respective information layers decreases, so that it is less likely that the qualities in record/reply deteriorate.

The information recording medium according to another aspect of the present invention comprises a substrate; N information layers (N is an integer of 3 or more) formed on the substrate; (N-1) intermediate layers interposed between the information layers; and a protective layer, wherein a first reference point is formed on the substrate, a second reference point is formed on each of the intermediate layers, and a position of the second reference point with respect to the first reference point is different for each of the intermediate layers.

According to the foregoing configuration, the N information layers, the (N-1) intermediate layers interposed between the information layers, and the protective layer are formed on the substrate. The first reference point is formed on the substrate. The second reference point is formed on each of the intermediate layers. Since a position of the second reference point with respect to the first reference point is different for each of the intermediate layers, it is less likely that the thickness distribution of the intermediate layer is widened by the tilt of the transfer stamper. It is also less likely that worse points in thickness variation of the laminated resin layers are superposed. Consequently, the thickness variation from the surface of the protective layer to the respective information layers decreases, so that it is less likely that the qualities in record/reply deteriorate. As a result, a multi-layered medium with a greater recording capacity per layer becomes more precise so that the qualities in the record and the reply are less likely to deteriorate.

INDUSTRIAL APPLICABILITY

The principle of the foregoing embodiments may be suitably used for more precisely controlling thickness of intermediate layers in multi-layered information storage media. In particular, the principle of the foregoing embodiments may be suitably used for a multi-layered large capacity medium such as a three-layered information storage medium with a capacity of 100 GB, and to the manufacturing method thereof.

The invention claimed is:

1. A method for manufacturing an information recording medium including N information layers (where N is an integer of 3 or more), (N-1) intermediate layers interposed between the information layers and a protective layer laminated on the Nth information layer which are placed on a substrate formed with a first reference point, comprising:
a process of forming the information layer on the substrate;
a process of repeating, (N-1) times, a process of applying radiation curable resin on the information layer, a process of affixing a transfer stamper formed with a second reference point to the radiation curable resin, a process of curing the radiation curable resin by irradiation, and a process of forming the intermediate layer by peeling the transfer stamper at an interface with the radiation curable resin, in order to sequentially form the (N-1) information layers and the (N-1) intermediate layers and thereafter form the Nth information layer; and
a process of forming the protective layer on the Nth information layer, wherein
in the process of affixing the transfer stamper to the radiation curable resin, the transfer stamper is affixed so that the second reference point of the transfer stamper is each time at a different position with respect to the first reference point of the substrate.

2. The method for manufacturing an information recording medium according to claim 1, wherein there are tilt patterns of (N-1) transfer stampers where relative tilt directions of 3 o'clock, 6 o'clock, and 9 o'clock when the second reference point of the transfer stamper is defined as 0 o'clock direction are substantially the same tilt directions, respectively.

3. The method for manufacturing an information recording medium according to claim 2, wherein the tilt pattern of the transfer stamper is represented with a variation pattern of a tangential tilt with respect to the second reference point of the transfer stamper.

4. The method for manufacturing an information recording medium according to claim 1, wherein the second reference point of the transfer stamper is formed by a transfer stamper manufacturing device configured to manufacture the transfer stamper.

5. The method for manufacturing an information recording medium according to claim 4, wherein
the first reference point of the substrate is formed by the substrate manufacturing device configured to manufacture the substrate, and wherein
the process of affixing the transfer stamper to the radiation curable resin includes:
a process of reading the first reference point of the substrate; and
a process of rotating the substrate so as to adjust the first reference point of the substrate to a predetermined position at a position for affixing the transfer stamper to the substrate.

6. The method of manufacturing an information recording medium according to claim 5, wherein
the substrate includes a first surface to which the information layer is laminated and a second surface opposite to the first surface, and
the process of reading the first reference point of the substrate includes a process of irradiating from a side of the second surface and reading reflected light from the first surface through the substrate.

7. The method for manufacturing an information recording medium according to claim 5, wherein
the process of affixing the transfer stamper to radiation curable resin includes:
a process of reading the second reference point of the transfer stamper; and
a process of rotating the transfer stamper so that the second reference point of the transfer stamper is each time at a different position with respect to the first reference point of the substrate at a position of affixing the transfer stamper to the substrate.

8. The method for manufacturing an information recording medium according to claim 1, wherein
in the process of affixing the transfer stamper to the radiation curable resin, the transfer stamper is affixed to the substrate so that the second reference point of the transfer stamper is each time displaced within a range of 180/(N−1)±10% with respect to the first reference point of the substrate.

9. An information recording medium, comprising:

a substrate;

N information layers (N is an integer of 3 or more) formed on the substrate;

(N−1) intermediate layers interposed between the information layers; and a protective layer, wherein a first reference point is formed on the substrate, a second reference point is formed on each of the intermediate layers, and a position of the second reference point with respect to the first reference point is different for each of the intermediate layers.

10. The method for manufacturing an information recording medium according to claim 4, wherein the transfer stamper manufacturing device manufactures a first transfer stamper and a second transfer stamper as the transfer stamper, in the process of affixing the transfer stamper to the radiation curable resin, the second transfer stamper is affixed so that a positional relationship between the first reference point and the second reference point of the second transfer stamper is different from a positional relationship between the first reference point and the second reference point of the first transfer stamper.

* * * * *